United States Patent
Ayatsuka et al.

(10) Patent No.: US 8,341,555 B2
(45) Date of Patent: Dec. 25, 2012

(54) IMAGE MANAGING APPARATUS, IMAGE MANAGING METHOD AND IMAGE MANAGING PROGRAM

(75) Inventors: Yuji Ayatsuka, Tokyo (JP); Yukiko Sakata, Tokyo (JP); Junichiro Sakata, Tokyo (JP); Nariaki Satoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 12/129,351

(22) Filed: May 29, 2008

(65) Prior Publication Data

US 2008/0301586 A1 Dec. 4, 2008

(30) Foreign Application Priority Data

Jun. 4, 2007 (JP) ................. P2007-148645

(51) Int. Cl.
*G06F 3/00* (2006.01)
(52) U.S. Cl. ......... 715/853; 715/834; 715/867; 715/825
(58) Field of Classification Search ............... 715/838, 715/853, 834, 825
See application file for complete search history.

(56) References Cited

U.S. PATENT DOCUMENTS

| | | | | |
|---|---|---|---|---|
| 5,956,026 A * | 9/1999 | Ratakonda | ...................... | 715/723 |
| 5,956,453 A * | 9/1999 | Yaegashi et al. | ............... | 386/290 |
| 6,341,168 B1 * | 1/2002 | Nagasaka et al. | ............. | 382/107 |
| 6,526,215 B2 * | 2/2003 | Hirai et al. | ..................... | 386/282 |
| 6,847,733 B2 * | 1/2005 | Savakis et al. | ................. | 382/225 |
| 7,325,198 B2 * | 1/2008 | Adcock et al. | ................. | 715/722 |
| 7,437,005 B2 * | 10/2008 | Drucker et al. | ................ | 382/224 |
| 7,705,858 B2 * | 4/2010 | Ubillos et al. | ................. | 345/619 |
| 7,743,343 B2 * | 6/2010 | Fong et al. | ..................... | 715/841 |
| 7,779,358 B1 * | 8/2010 | Gupta et al. | ................... | 715/730 |
| 7,843,454 B1 * | 11/2010 | Biswas | .......................... | 345/473 |
| 2002/0196293 A1 * | 12/2002 | Suppan et al. | ................ | 345/853 |
| 2003/0080977 A1 * | 5/2003 | Scott et al. | ..................... | 345/629 |
| 2003/0113037 A1 * | 6/2003 | Yoda | ............................. | 382/302 |
| 2003/0169288 A1 * | 9/2003 | Misawa | ......................... | 345/719 |
| 2004/0024758 A1 * | 2/2004 | Iwasaki | ............................ | 707/3 |
| 2006/0139461 A1 * | 6/2006 | Matsui et al. | .............. | 348/231.2 |
| 2006/0271884 A1 * | 11/2006 | Hurst | ............................ | 715/854 |
| 2007/0100829 A1 * | 5/2007 | Allen et al. | ....................... | 707/9 |
| 2007/0127576 A1 * | 6/2007 | Henocq et al. | ........... | 375/240.16 |

(Continued)

FOREIGN PATENT DOCUMENTS

JP 2000-41209 2/2000

(Continued)

*Primary Examiner* — Ryan Pitaro
(74) *Attorney, Agent, or Firm* — Finnegan, Henderson, Farabow, Garrett & Dunner LLP

(57) ABSTRACT

An image managing apparatus includes a storage part, an input part, a grouping-processing part, a representative image extraction part, a folding-button preparing part, a folding-screen preparing part and an output part. An image is stored in the storage part. A user's instruction is input by the input part. The grouping-processing part is configured to classify images displayed on a screen into a group for display based on the instruction. The representative image extraction part is configured to extract an image in the group as a representative image of the group. The folding-button preparing part is configured to generate a folding button for displaying the representative image of the group on the screen. The folding-screen preparing part is configured to generate an image-listing screen ("folding screen")") on which the representative image of the group and an ungrouped image are displayed when the folding-button displayed on the screen is operated.

15 Claims, 18 Drawing Sheets

U.S. PATENT DOCUMENTS

| | | |
|---|---|---|
| 2007/0136286 A1* | 6/2007 | Webster et al. .................. 707/7 |
| 2007/0172809 A1* | 7/2007 | Gupta .......................... 434/350 |
| 2008/0012954 A1* | 1/2008 | Sasaki et al. ............... 348/222.1 |
| 2008/0205772 A1* | 8/2008 | Blose et al. .................. 382/225 |
| 2009/0066838 A1* | 3/2009 | Kasutani ...................... 348/564 |
| 2009/0119585 A1* | 5/2009 | Sakuyama et al. ............ 715/273 |
| 2009/0327892 A1* | 12/2009 | Douillet et al. ............... 715/717 |
| 2010/0146447 A1* | 6/2010 | Ubillos et al. ................ 715/828 |
| 2010/0149212 A1* | 6/2010 | Fukuya et al. ................ 345/629 |
| 2010/0192095 A1* | 7/2010 | Ubillos et al. ................ 715/810 |
| 2010/0240019 A1* | 9/2010 | Sathy ........................... 434/365 |
| 2010/0281084 A1* | 11/2010 | Gupta et al. .................. 707/822 |

FOREIGN PATENT DOCUMENTS

| | | |
|---|---|---|
| JP | 2000-041209 | 2/2000 |
| JP | 2003-203090 | 7/2003 |
| JP | 2003-338999 | 11/2003 |
| JP | 2005-049968 | 2/2005 |
| JP | 2007-052403 | 3/2007 |
| JP | 2007-52403 | 3/2007 |

* cited by examiner

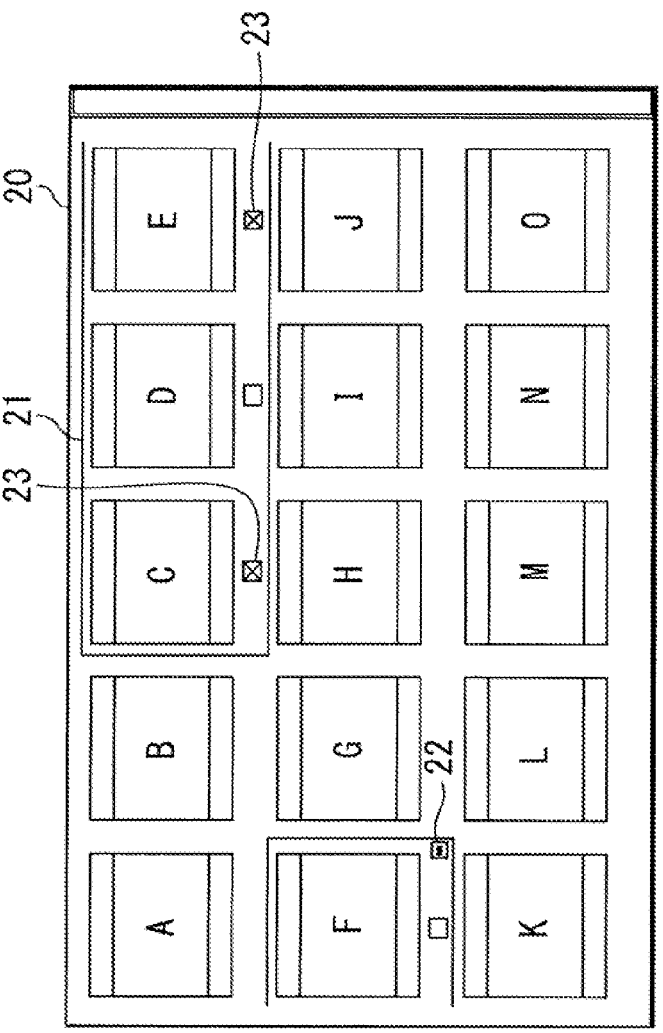
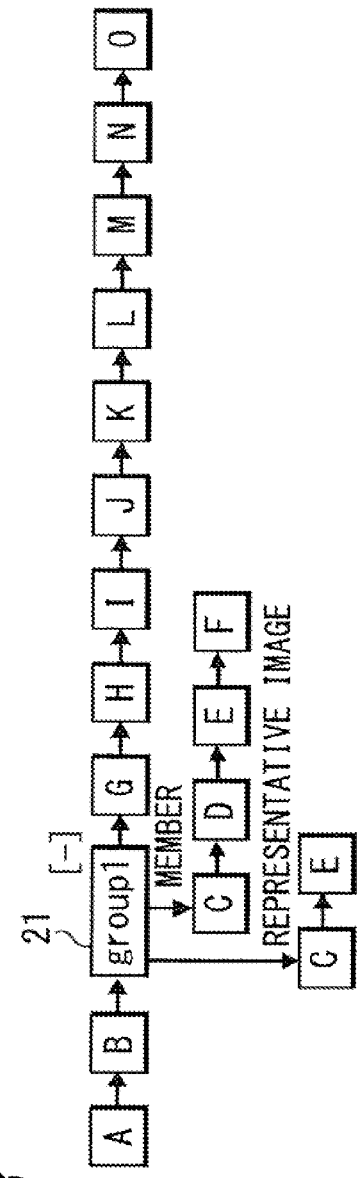
FIG. 4A
FIG. 4B

FIG. 6

```
 1:  class Item {
 2:  // individual pictures, class representative of group
 3:   Item next; // link to next picture or next group
 4:  }
 5:
 6:  class Photo extends Item {
 7:   // class representing individual pictures
 8:    String filename; // place where data body of picture is present
 9:    boolean selected; // whether it is selected or not
10:    boolean dontshow; // whether it is non-displayed or not
11:    ...
12:  }
13:
14:  class Group extends Item {
15:   // class representative of group
16:    String groupID; // group ID (for identification in program)
17:    Item member; // list of members in group
18:    Item representatives; // list of representative images
19:    boolean folded; // whether it is folded or not
20:    ...
21:  }
```

FIG. 7

```
 1: p /home/photo/wedding/A.jpg
 2: p /home/photo/wedding/B.jpg
 3: g group1
 4: p /home/photo/wedding/C.jpg
 5: p /home/photo/wedding/D.jpg
 6: p /home/photo/wedding/E.jpg
 7: p /home/photo/wedding/F.jpg
 8: :
 9:   /home/photo/wedding/C.jpg
10:   /home/photo/wedding/E.jpg
11: ]
12: p /home/photo/wedding/G.jpg
13: p /home/photo/wedding/H.jpg
14: p /home/photo/wedding/I.jpg
15: p /home/photo/wedding/J.jpg
16: p /home/photo/wedding/K.jpg
17: p /home/photo/wedding/L.jpg
18: p /home/photo/wedding/M.jpg
19: g group2
20: p /home/photo/wedding/N.jpg
21: p /home/photo/wedding/O.jpg
22: :
23: ]
```

IMAGE MANAGING APPARATUS, IMAGE MANAGING METHOD AND IMAGE MANAGING PROGRAM

CROSS REFERENCES TO RELATED APPLICATIONS

The present invention contains subject matter related to Japanese Patent Application JP 2007-148645 filed in the Japanese Patent Office on Jun. 4, 2007, the entire contents of which being incorporated herein by reference.

BACKGROUND OF THE INVENTION

1. Field of the Invention

This invention relates to an image managing apparatus, an image managing method, and an image managing program, which are suitable for managing a plurality of images.

2. Description of the Related Art

Digital cameras, scanners, and so on have been widely used and everyone may easily acquire digital images. As a result, fens of thousands or more of photographs (images) may be stored in a hard disk of a personal computer (hereinafter, referred to as "PC") or the like. Furthermore, if a digital camera is used, images can be taken casually, so that many images of the same scene may be captured in quest of a better shot. Images taken in this way are large in number, so that it will take time and be inconvenient to see them later. For example, it takes about 20 minutes to see 1,000 pictures even if making a glance at each picture every one second. Thus, it is hard, to look through the whole in this way and it is inconvenient for the user to organise and assort them.

Therefore, computers, such as PCs, have been used to organize images by any technique as described below. A structure that is called a folder or a directory in a file system employed in a general computer is convenient to sort and store pictures (images) by date, place, and occasion (first technique). The user can make hierarchically-organized directories and folders, so that images can be easily subdivided by scenes or the like of every episode or event at different times of a day.

Furthermore, the following method has also been carried out in the art. That is, if the user intends to "see or send to someone a picture (image) selected from each scene", a directory or a folder for that purpose is made and the selected images are then copied therein. Subsequently, the directory or the folder is recorded on a recording medium and then sent to a person. Alternatively, an image file, which is the one the user wishes to show the person, may be attached to an e-mail and sent to the person. Alternatively, a shortcut indicating a link to the image may foe described on the message body of the e-mail or on a predetermined WWW page (second technique).

As another method, which becomes widely used, a tag that represents an event or a subject may be attached to an image and the information described on such a tag may be then used as a key for searching the image of interest by making a short list of images. Thus, the image of interest can be easily accessed (third technique).

Furthermore, a study of analyzing an image to recognize a person on the image and then automatically providing the image with a tag has been carried out in the art. For example, an image-space displaying method has been proposed. In this method, comparable images are collected and placed in groups and one image is then extracted and displayed from each group (see, for example, Japanese Unexamined Patent Application Publication No. 2003-2030510) (fourth technique).

SUMMARY OF THE INVENTION

The first technique urges the user to look directories and folders one by one when the user wishes to view the images being finely classified and stored. Thus, a complicated operation may be required for making a glance over the whole at once.

In addition, the second technique to create a new directory or folder every time the user exhibits or transmits an image to the person is a troublesome work for the user.

Furthermore, using the third technique, a request of the user, such as "having only images selected from the respective scenes", may not be satisfied only by searching with tags. In addition, it is difficult for the user to manually provide the images with appropriate tags when the number of images is large, because it takes too much effort to carry out the work from the beginning.

Furthermore, the fourth technique alone may be insufficient to satisfy the user's request. For example, there is no support to the selection of one or two or more from comparable images. Even if images are not alike, the user may desire to place them in the same group. However, there is no support to such a user's demand.

The present invention addresses the above identified, and other problems associated with conventional methods and apparatuses. It is desirable to efficiently organize a large number of images of one event and hold them in an easily-viewable state depending on the purpose and the person.

According to an embodiment of the present invention, there is provided an image managing apparatus. When a plurality of images is organized using the image managing apparatus, images displayed on a screen in an edit mode is sorted and grouped in appropriate groups for the display based on instructions from an input part. Then, an image desired by the user is extracted from images in the group and provided as a representative image of the group. Subsequently, the image of a folding button for displaying the representative image of the group is displayed. When the folding button displayed on the screen is operated, an image-listing screen on which the representative image of the group and the ungrouped images are displayed is prepared, followed by outputting the image-listing screen to the outside.

According to the above configuration, a large number of images can be grouped according to the user's instruction. Then, the representative image of the group is selected according to the user's instruction. Subsequently, when the folding button is operated, the image selected by the user is displayed as a representative image on the screen together with ungrouped images.

According to the embodiment of the present invention, the user is allowed to efficiently organize a large number of images of one event and hold them in an easily-viewable state depending on the purpose and the person.

BRIEF DESCRIPTION OF THE DRAWINGS

FIG. 2 is a schematic diagram, where

FIG. 3 is a schematic diagram, where

FIG. 4 is a schematic diagram, where FIG. 4A represents a state of the image-listing screen and FIG. 4B represents a data structure (3) corresponding to such a state.

FIG. 5 is a schematic diagram, where

FIG. 6 is a diagram illustrating a data structure (program code).

FIG. 7 is a diagram illustrating a data structure represented by a text file.

FIG. 13 is a schematic diagram illustrating a display example of the image-listing screen after folding groups, where

DESCRIPTION OF THE PREFERRED EMBODIMENTS

Hereinafter, an exemplified embodiment of the present invention will be described with reference to FIGS. 1 to 23. An image managing apparatus 1 in accordance with an embodiment of the present invention is formed of a personal computer but not limited thereto. Alternatively, the image managing apparatus may be, for example, a mobile phone, a personal digital assistant (PDA), or a game console.

<Configuration of Image Managing Apparatus>

First, the configuration of the image managing apparatus in accordance with the embodiment of the present invention will, be described.

Figure 1:
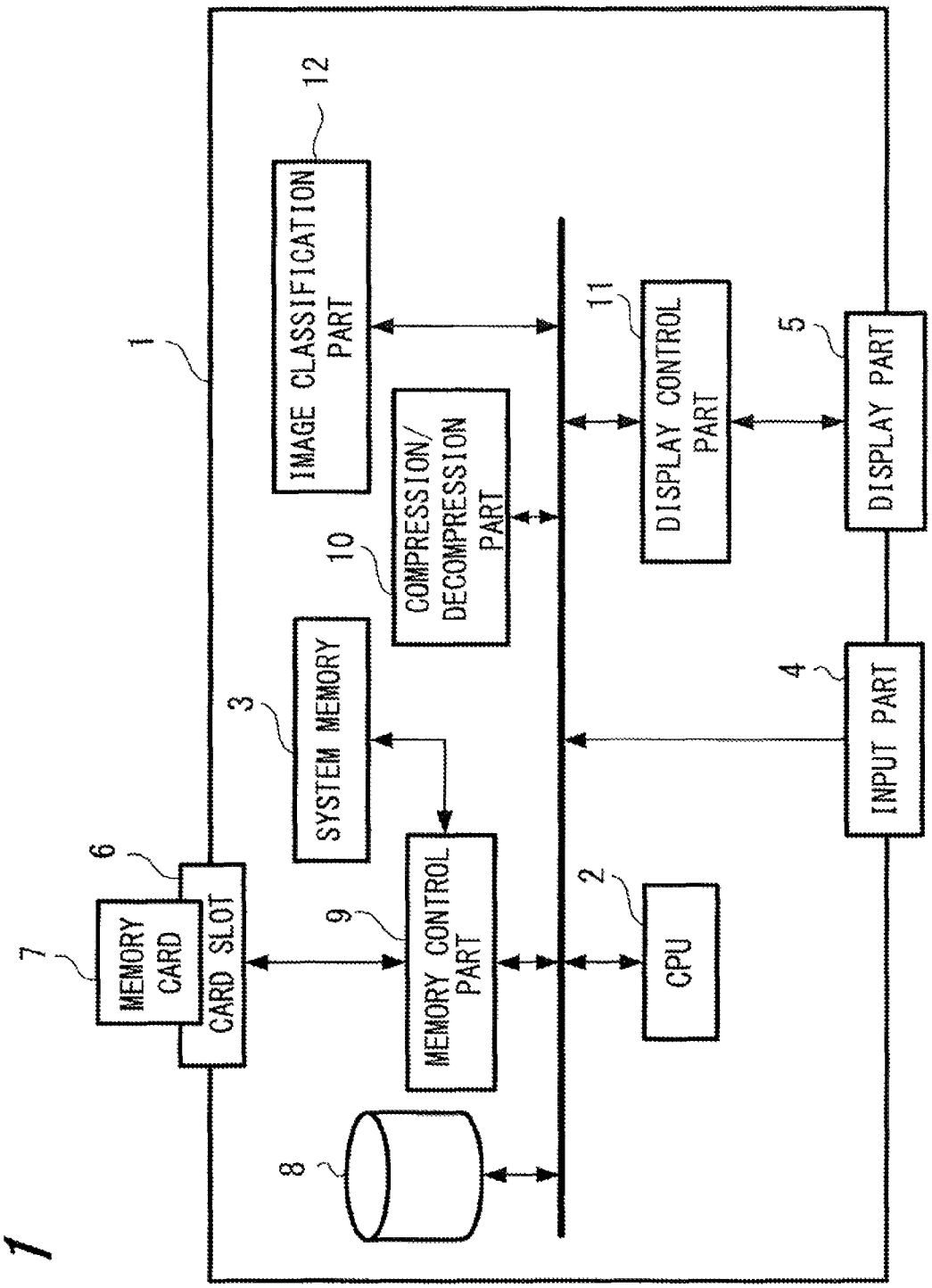
FIG. 1 is a block diagram illustrating the configuration of an image managing apparatus according to an embodiment of the present invention.
Figure 2A:
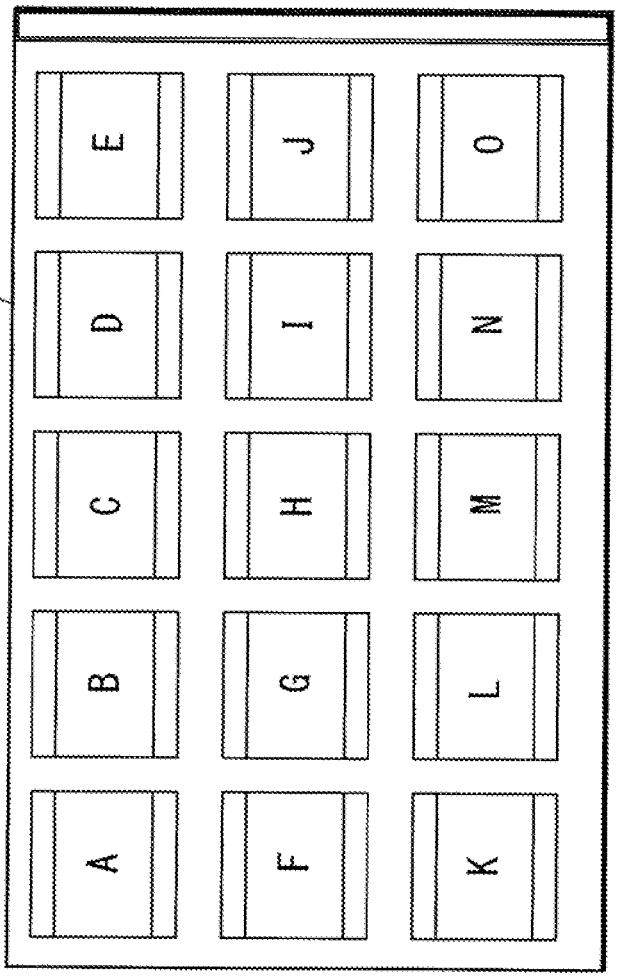
FIG. 2A represents a state of the image-listing screen and FIG. 2B represents a data structure (1) corresponding to such a state.
Figure 2B:
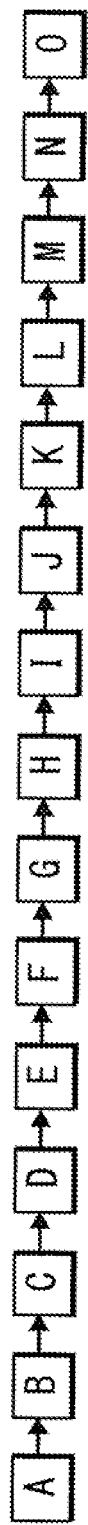

FIG. 1 is a schematic block diagram illustrating the configuration of the image managing apparatus in accordance with the embodiment of the present invention.

As shown in FIG. 1, the image managing apparatus 1 of the present embodiment includes a CPU 2, a system memory 3, an input part 4, and a display part 5. The CPU 2 is configured to control each part of the image managing apparatus 1 in addition to performs various kinds of control, such as image-data recording control or displaying control. The input part 4 has a keyboard, a mouse, and so on to provide the image managing apparatus 1 with various kinds of instruction. The display part 5 is formed of a liquid crystal monitor or the like for various kinds of representation.

The CPU 2 may function as a grouping-processing part, a representative image extraction part, a folding-button preparing part, a folding-screen preparing part, an unfolding button preparing part, an unfolding-image preparing part, and an output part as described in claims.

The system memory 3 includes a computer program for operating the CPU 2, a ROM (not shown) in which a viewer software for browsing images, various constants, and so on are recorded, and a RNA that acts as a work area when the CPU 2 carries out processing.

Furthermore, the image managing apparatus 1 includes a card slot 6, a compression/decompression part 10, a hard disk 8, and a memory control part 9. The card slot 6 is configured to read image data from a memory card 1 (recording medium) that stores the image data and record image data in the memory card 7. The compression/decompression part 10 is configured to compress image data by any of procedures as represented by JPEG and motion JPEG and decompress compressed image data. Image data (containing tag information or met a data), various programs to be carried out by the CPU 2, and so on are recorded in the hard disk 8. The memory control part 9 is configured to control the system memory 3, the card slot 6, and the hard disk 8.

In addition, the image managing apparatus 1 includes an image classification part 12 that classifies user-desiring images stored in a folder into a plurality of categories in a hierarchical structure. Furthermore, the image managing apparatus 1 includes a display control part 11 for controlling the representation on the display part 5. The display control part 11 functions as an output part together with the CPU 2.

An image classification part 12 classifies a plurality of images stored in the hard disk 8 into a plurality of categories in a hierarchical structure. For example, images can be classified according to date, place, occasion, or the like of the respective images. Furthermore, for example, a procedure described in Japanese Unexamined Patent Application Publication No. 2003-203090 as described above is employed to have similar images in one group. Furthermore, the image classification part 12 is used for assisting the user to arrange a plurality of images by hand, so that it may not be required in the image managing apparatus according to an embodiment of the invention.

Data can be sent and received between the respective parts of the image managing apparatus 1 by connecting the parts each other through appropriate buses.

<Outline of Image Organization Technique>

Referring now to FIGS. 2 to 7, the state of an image-listing screen displayed in the image managing apparatus 1 and the outline of a data structure will be described. In particular, an image organization technique in accordance with the embodiment of the present invention will be described by representing a correspondence between the state of a screen on which an image list is displayed and a data structure thereof, while images are being grouped.

FIGS. 2 to 5 represent the states of grouped image-listing screens and their corresponding data structures (1) to (4), respectively. First, an image-listing screen 20 shown in FIG. 2A represents an initial state of the screen displayed on the display part 5 of the image managing apparatus 1. In this example, images A to O (15 images in total) are displayed. FIG. 2B represents a data structure of the above image-listing screen 20. In this example, the address (file-storing position) of image B is specified (pointer is written in) so that image A can link to image B. In addition, the address of image C is specified so that image B can link to image C. Links are provided so that the CPU 2 can refer from image A to image O in order.

Figure 3A:
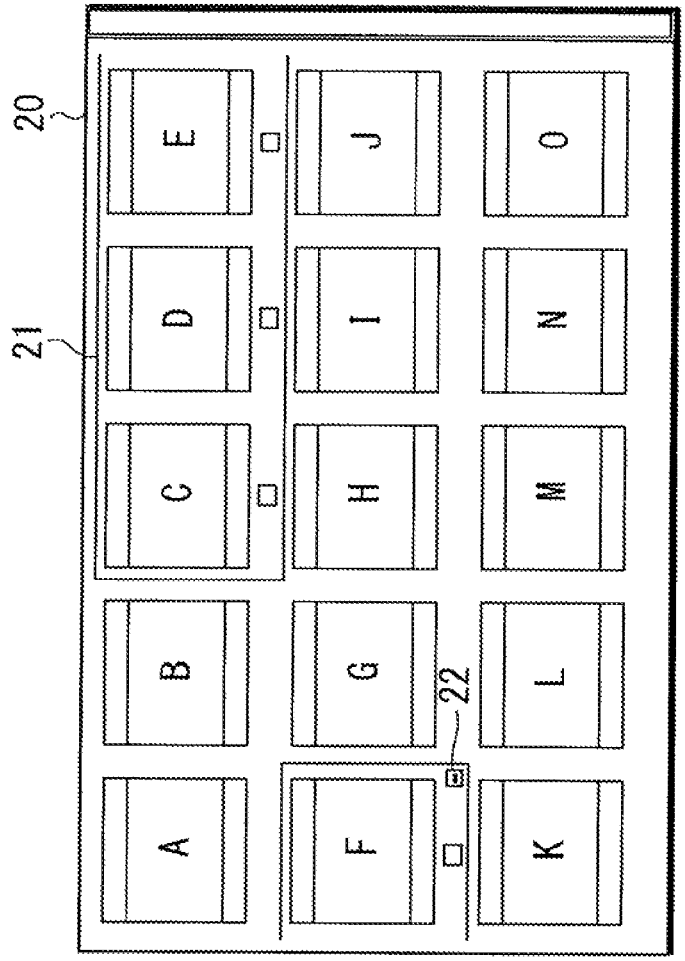
FIG. 3A represents a state of the image-listing screen and FIG. 3B represents a data structure (2) corresponding to such a state.

Here, the user may select images C, D, E, and F on the image-listing screen 20 and make them a group using the input part 4. FIG. 3A shows the image-listing screen 20 after such a grouping operation. In FIG. 3A, the selected images C, D, E, and F form group 21 and these images are surrounded by an approximately square-shaped frame. At a predetermined position of the frame of group 21, "folding button (−)" 22 for folding and displaying the frame is displayed. As later described, when the user places the pointer on the folding button 22 and then clicks thereon, the representative image of group 21 is displayed and the frame becomes smaller (the frame is folded).

Figure 3B:
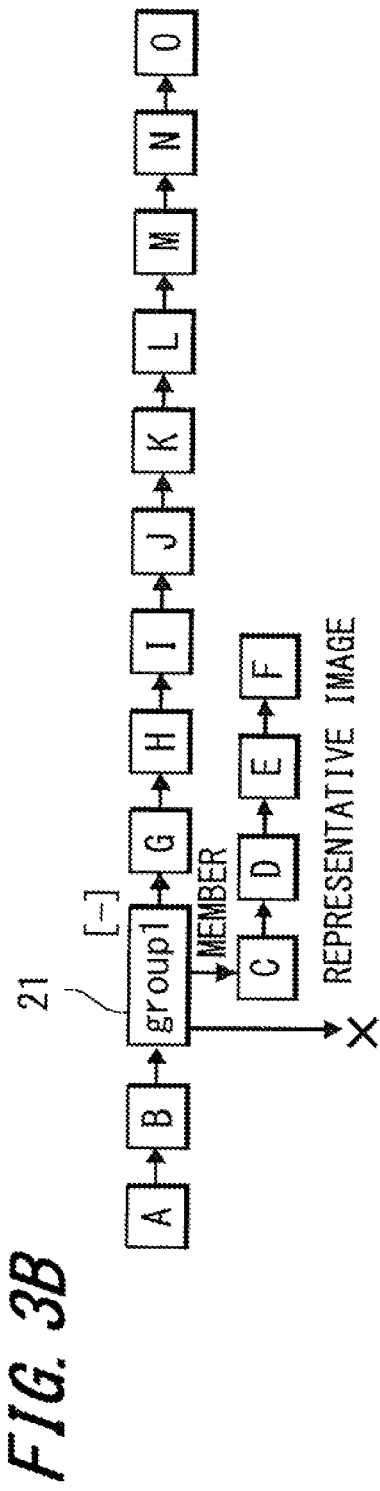

If the images C, D, E, and F are grouped, as shown in FIG. 3B, the data structure of the image group represented on the image-listing screen 20 includes images arranged in the order of image A, image B, group 21 (group 1), image G, . . . and image O. The members (constituent images) of group 21 are found to follow links represented by the respective arrows. The data structure shown in FIG. 3B reflects that the images C, D, E, and F have been selected as members of group 21. There is no representative image of group 21 selected in this stage. In addition, the sign [−] is placed on the right shoulder of group 21 (group 1) to represent "unfolded" as shown in FIG. 3B.

Subsequently, the user selects images C and E as representative images on the image-listing screen 20 in FIG. 3A using the input part 4, FIG. 4A represents the image-listing screen 20 after the selection of the representative images. As shown in FIG. 4A, an image can be selected by operating the input part 4 to mark check boxes 23 of the respective images C and D of image group 21. As illustrated in this example, the representative image is not limited to one image. A plurality of images may be selected as representative images.

As shown in FIG. 4B, the representative images are found to follow links represented by the arrows, respectively, A data structure shown in FIG. 4B reflects that images C and E have been selected, as representative images.

Figure 5A:
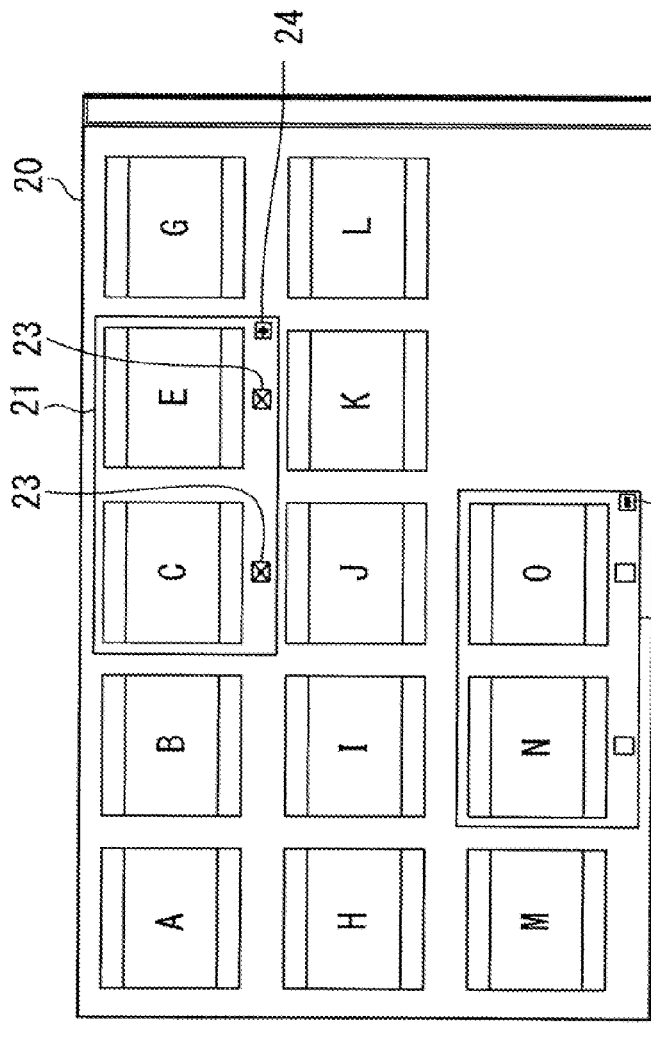
FIG. 5A represents a state of the image-listing screen and FIG. 5B represents a data structure (4) corresponding to such a state.

Subsequently, the user folds group 21 formed of images C, D, E, and F on the image-listing screen 20 in FIG. 4A and images N and O are then newly grouped using the input part 4. FIG. 5A represents the image-listing screen 20 after performing these operations. As shown in FIG. 5A, among images constituting group 21, the representative images, images C and E, are only displayed and "unfolding button [+]" 24 is displayed at the predetermined position of the frame. The images N and O are surrounded by a frame, thereby forming a new group 25.

Figure 5B:
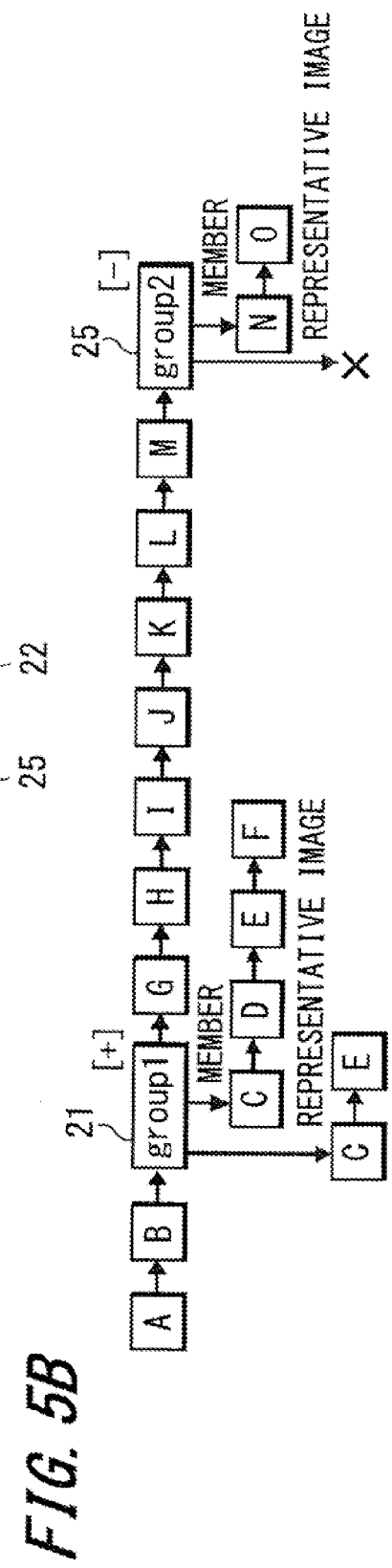

As shown in FIG. 5B, the sign [+] on the right shoulder of group 21 (group 1) represents "folded" (unfoldable) in the data structure. In addition, the group 25 (group 2) is formed in the data structure, reflecting that the data structure links images N and O as members of the group 25 and a representative image is unselected.

FIG. 6 represents a program code of the data structure of the image group displayed on the image-listing screen. The program code is prepared using JAVA®, C++, or the like. Note that, as shown in FIG. 6, both a numeric character and a colon sign at the head of each sentence are provided for the convenience of description and are not a portion of the code.

The "class Item { }" on lines 1 to 4 represents the information about the presence or absence of a picture (image) or a group and the information about a link (address) to a next picture, (image) or a next group.

The "class Photo extends Item { }" on lines 6 to 12 is a class that represents individual photographs (images), representing the detailed information of images. Specifically, the information about a place where the data body of the image is present, the information about whether the user is now selecting the image, the information about whether it is in a non-display mode, and so on are described.

The "class Group extends Item { }" on lines 14 to 21 is a class representing a group and showing the information about the details of the group. Specifically, various kinds of the information described include the ID of the group (for identifying the group in the program), a list of members in the group, a list of representative images, a state of being folded or unfolded, and so on.

FIG. 7 represents a state of writing the data structure represented in FIG. 8B as a text file. With "p" described at the head of each line, the line indicates the file name of each picture (image). With "g" described at the head of each line, the line indicates the group ID. On the line(s) subsequent to the line representing the group ID, the members of the groups are arranged in order up to ":". Subsequently, the representative images of the group are arranged in order up to "]".

In other words, in the example shown in FIG. 7, lines 3 to 7 represent the group 21 (group 1) including images C, D, E, and F and lines 9 and 10 represent images C and E as representative images of the group 21 (group 1), respectively. In addition, lines 12 to 18 represent independent images G to M and lines 19 to 21 represent the group 25 (group 2) including images N and O, respectively.

As described above, the program code and the text file of the data structure illustrated in FIGS. 6 and 7 are recorded in the system memory 3 or the hard disk 8 and updated as needed. The information indicating the data structure is referred to as tag information or metadata. For example, a tag is automatically attached to images manually grouped or the group. When the tag is attached to the group, it reflects to the respective images therein. Thus, tags can be easily attached to a large amount of images, respectively.

According to the image-organization technique as heretofore described, a large number of images of one event can be efficiently organized and collected to be shown to others.

<Specific Example of Grouping>

Figure 8:
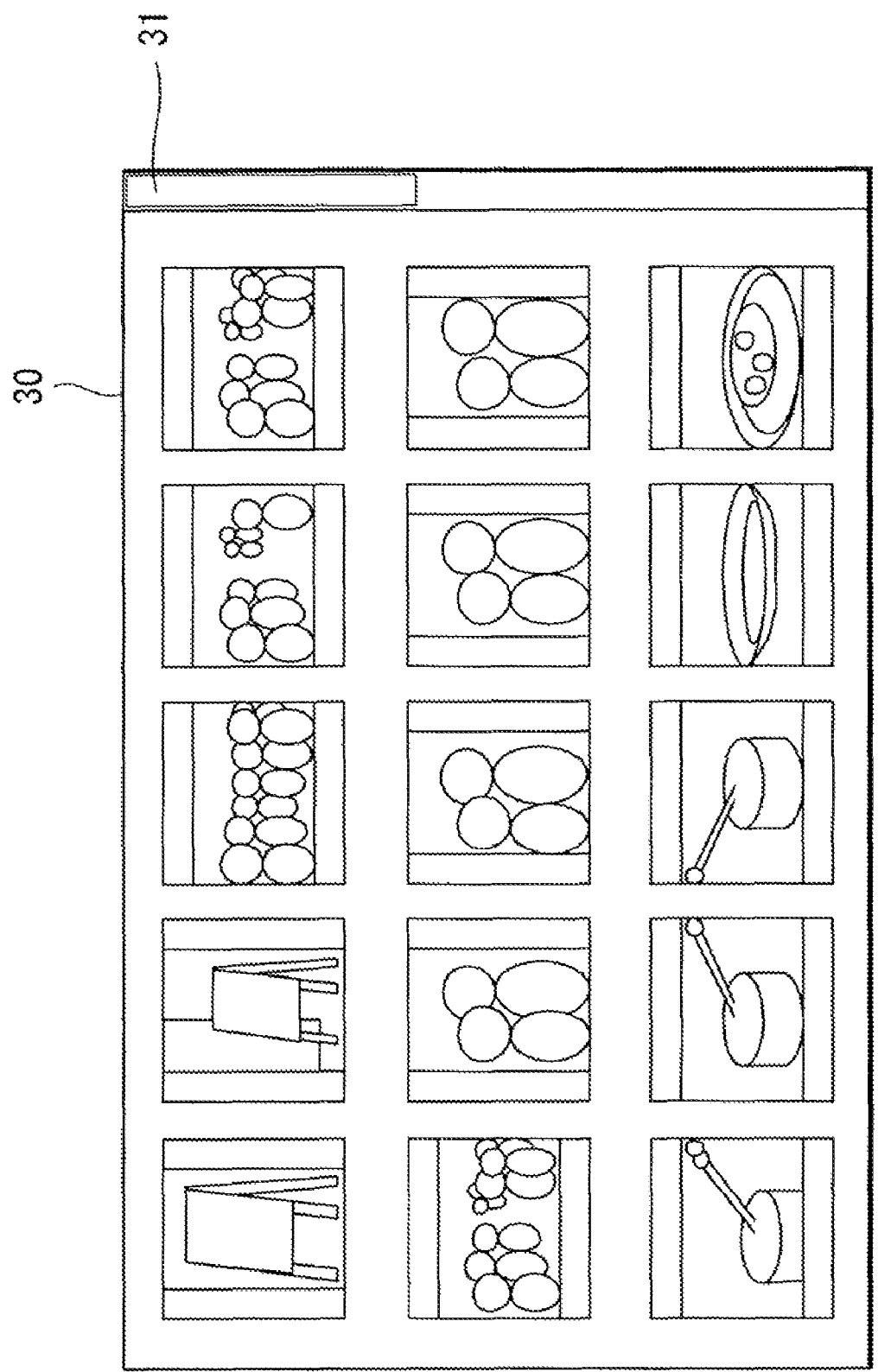
FIG. 8 is a schematic diagram illustrating a display example of an image-listing screen of an image managing application.

A technology on which an embodiment of the present invention is based is an application capable of browsing pictures (images) in thumbnails. As shown in FIG. 8, a set of images (referred to as an archive) taken in one event (for example, marriage ceremony) is displayed on the display part 5 in the order of time and file name. On the image-listing screen 30 shown in FIG. 8, for example, images of a sign, guests, the bride and groom, cutting of the cake, a meal, and so on are displayed. The user may change the display order of these images by dragging and dropping the images or the like through the operation of the input part 4. In addition, the viewing area in the image-listing screen 30 can be moved by scrolling a scroll bar 31 up and down while drugging.

Hereinafter, the procedures of grouping and displaying images will be described.

Figure 9:
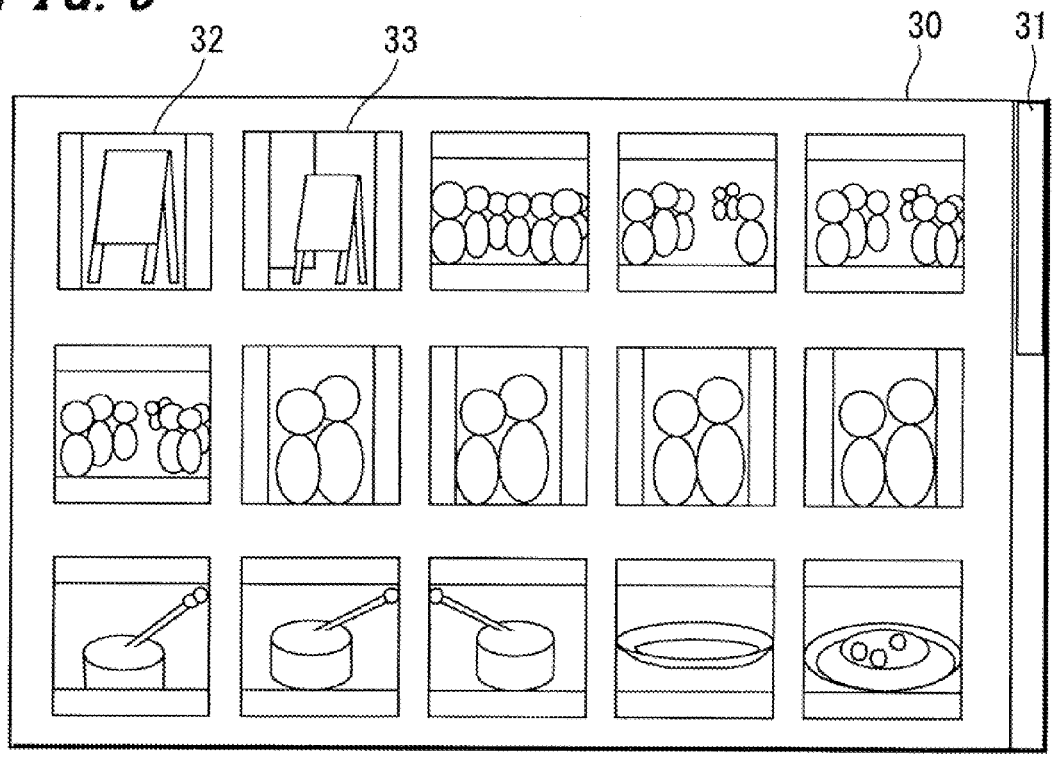
FIG. 9 is a schematic diagram illustrating a display example of the image-listing screen (after selecting images).

First, as shown in FIG. 9, the user selects both an image 32 and an image 33 on the image-listing screen 30 displayed on the display part 5 by placing the pointer over the images and then clicking thereon, respectively. In this example, the edges of the selected image are represented by thick lines. The data of selected images 32 and 33 (see FIG. 6) are immediately rewritten by the CPU 2.

Figure 10:
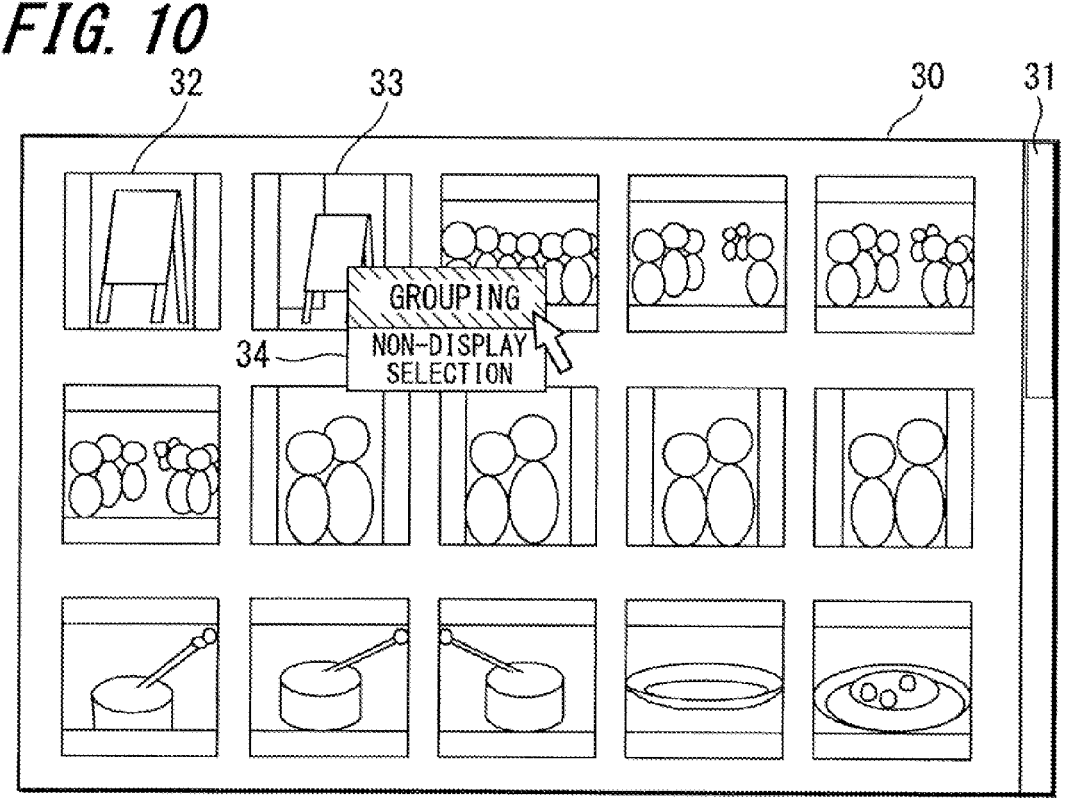
FIG. 10 is a schematic diagram illustrating an operation process for grouping images.

Next, the images 32 and 33 are grouped. Specifically, as shown in FIG. 10, when the user places and clicks the pointer on any of a plurality of the selected images in the image-listing screen 30, then the CPU 2 displays a pup-up menu 34 on the image-listing screen 30. Subsequently, if the user selects "grouping" on the pup-up menu 34, a group including the images 32 and 33 as members is formed. If the user selects "non-display selection" on the pop-up menu 34, the selected image will be non-displayed in a browsing mode as described later or at the time of sending a mail.

Figure 11:
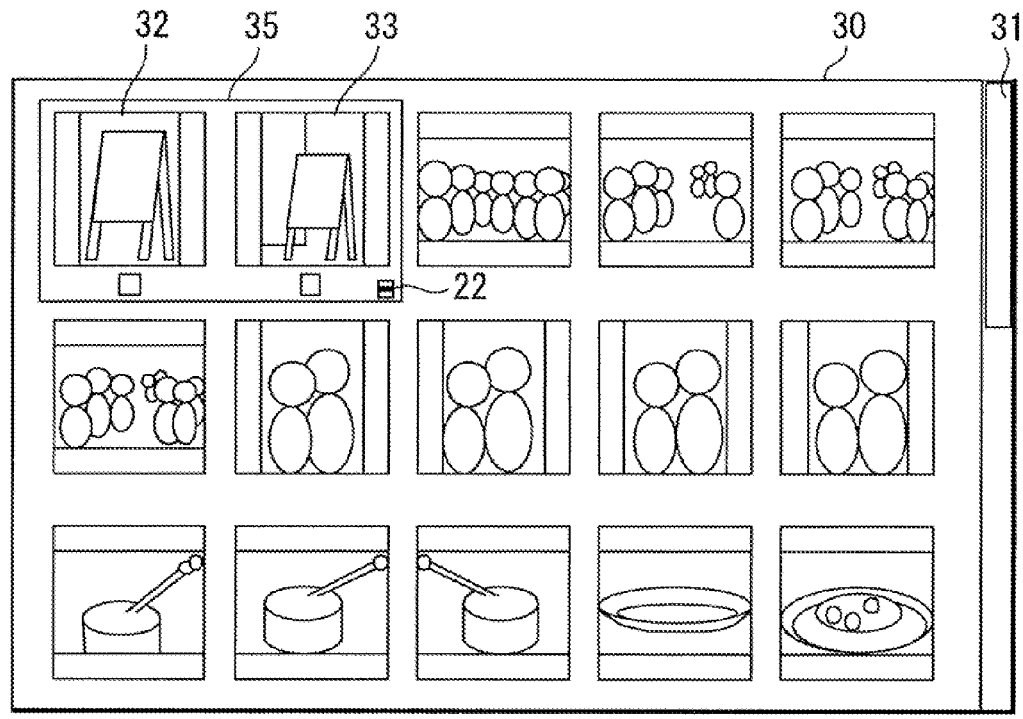
FIG. 11 is a schematic diagram illustrating a display example of the image-listing screen (after grouping).

The grouped images 32 and 33 are illustrated in FIG. 11. An approximately square-shaped frame is displayed around the images 32 and 33, so that the images 32 and 33 can be readily recognized as those in the same group 35. In addition, the folding button [–] 22 is represented at a predetermined position of the frame indicating the grouping, for example, at the right bottom corner thereof. The folding button [–] 22 is responsible for representing only the representative images and folding the group 35.

When a group is selected and a pop-up menu is then displayed to select "cancel" (not shown), the group can be canceled. In this way, the group can be easily formed and canceled. In addition, images may be grouped to have a hierarchical order. In other words, groups may be further formed in one group.

Figure 12:
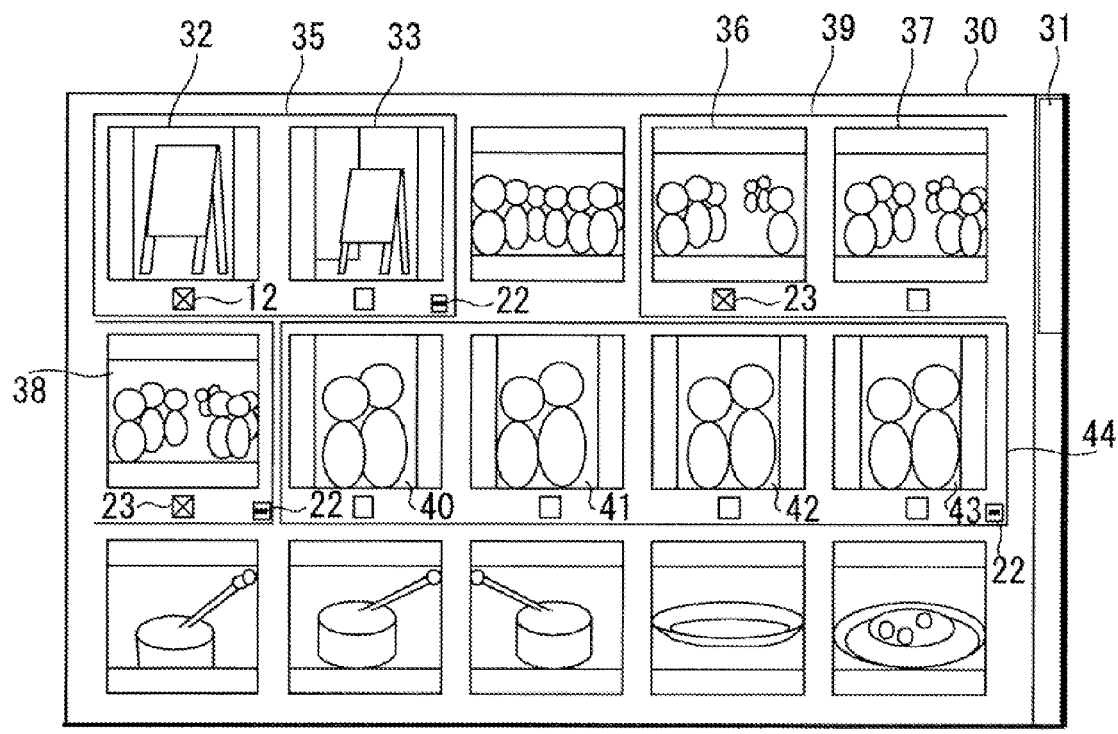
FIG. 12 is a schematic diagram illustrating a display example of the image-listing screen (after selecting representative images).

Subsequently, the user selects a representative image in each group on the image-listing screen 30. As shown in FIG. 12, the user puts a checkmark, in a check box 23 represented below any of the grouped images through the operation of the input part 4. In the example shown in FIG. 12, the image 32 in the group 35 and the images 36 and 38 in the group 39 are selected as representative images. In contrast, no representative image is selected from another group 44 including images 40, 41, 42, and 43 as members. The CPU 2 updates the information about the groups 35, 39, and 44 and the data of the images 32, 36, and 38 selected as the representative images of the respective groups (see FIGS. 6 and 8) and then records them in the hard disk 8 or the like.

Subsequently, each group is folded. In other words, the representative images of the respective groups alone are displayed on the image-listing screen 30. As shown in FIG. 12, the folding buttons 22 at the ends of the respective frames of the groups 35, 39, and 44 are clicked. Subsequently, the CPU 2 detects the user's instruction of folding operation and then controls the image-listing screen 30 to display only the representative images of the respective groups.

Figure 13A:
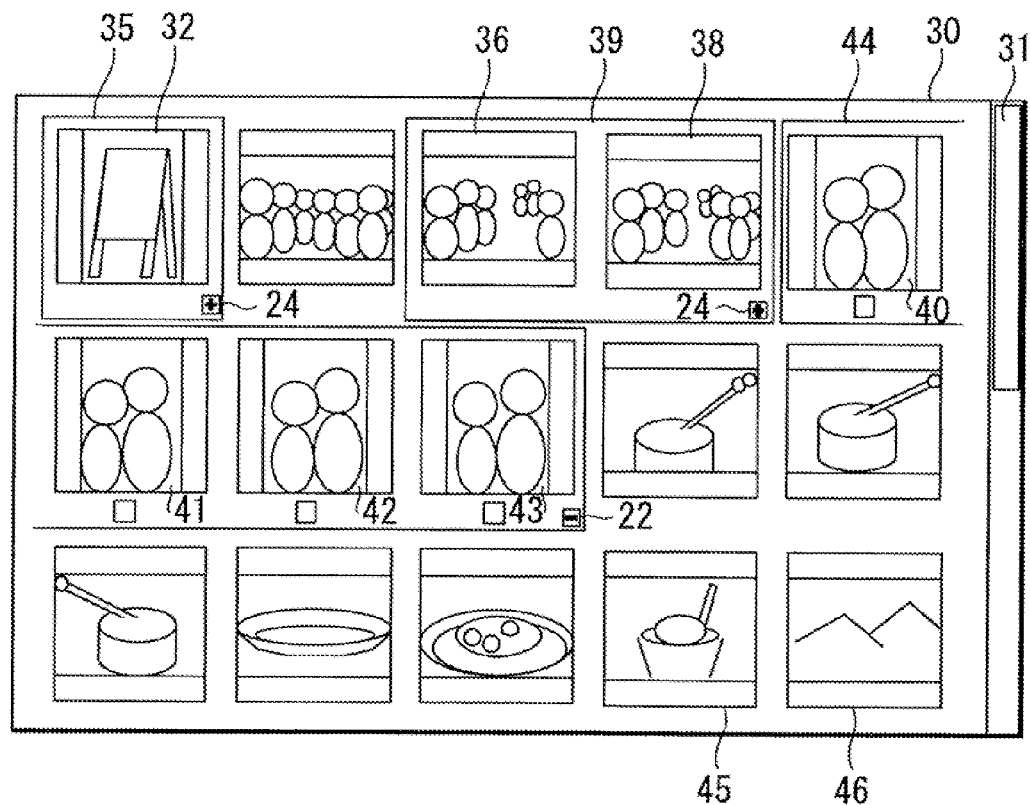
FIG. 13A is illustrates a case in which representative images are selected and FIG. 13B is a case in which no representative image is selected.
Figure 13B:
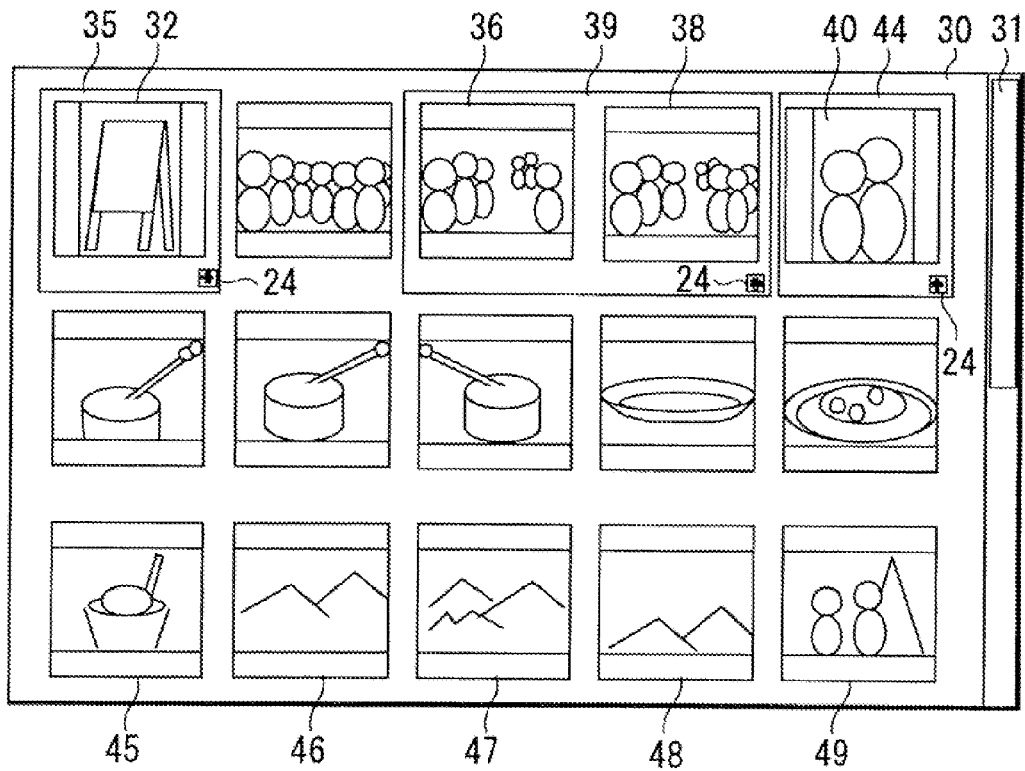

FIG. 13A illustrates a case where the representative images of the respective groups are selected and FIG. 13B illustrates a case where the representative images of the respective groups are not selected. As shown in FIG. 13A, the groups 35 and 39 have selected representative images, respectively. Thus, the CPU 2 displays images 32, 36, and 38 as representative images on the image-listing screen 30, respectively. However, no representative image is selected from the group 44, so that all members (images 40 to 43) of the group 44 can be displayed under the control of the CPU 2. In the example shown in FIG. 13A, the groups 35 and 39 have been folded, so that images arranged at lower positions move up one by one. The image (dish) 45 and the image (honeymoon) 46 are displayed on the image-listing screen 30.

On the other hand, in FIG. 13B, the leading image 40 in the group 44 is displayed as a representative image of the group 44. Alternatively, instead of the leading image, any image automatically selected from the images in the group 44 may be employed as a representative image. In this way, if the user may not select any image as a representative image of the group, the representative image can be selected and the group in a folded state can be displayed. Therefore, a display space can be saved for further organizing the images. In the example of FIG. 13B, the groups 35, 39, and 44 are folded and the images arranged at the lower positions are then moved up one by one. Therefore, an image (dish) 45 and images (honeymoon) 46 to 49 are displayed on the image-listing screen 30.

The CPU 2 updates the information about the above groups 35, 39, and 44 (see FIG. 6) and then records them in the hard disk 8 or the like.

When the user clicks the unfolding button 24 at the end of the frame of each folded group through the operation of the input part 4, the group is returned to an unfolded state as shown in FIG. 12.

In the case where the groups are hierarchically organized, the representative image of a child group may be directly provided as a representative image of a parent group. Alternatively, any image may be selected from the images in the child group and then employed as a representative image of the parent group.

Furthermore, at the time of folding and unfolding the group, animation or other expression may be used so that the user can readily understand such action being carried out. An example of using animation on the image-listing screen when the group is folded or unfolded is illustrated In FIGS. 14 to 18.

Figure 14:
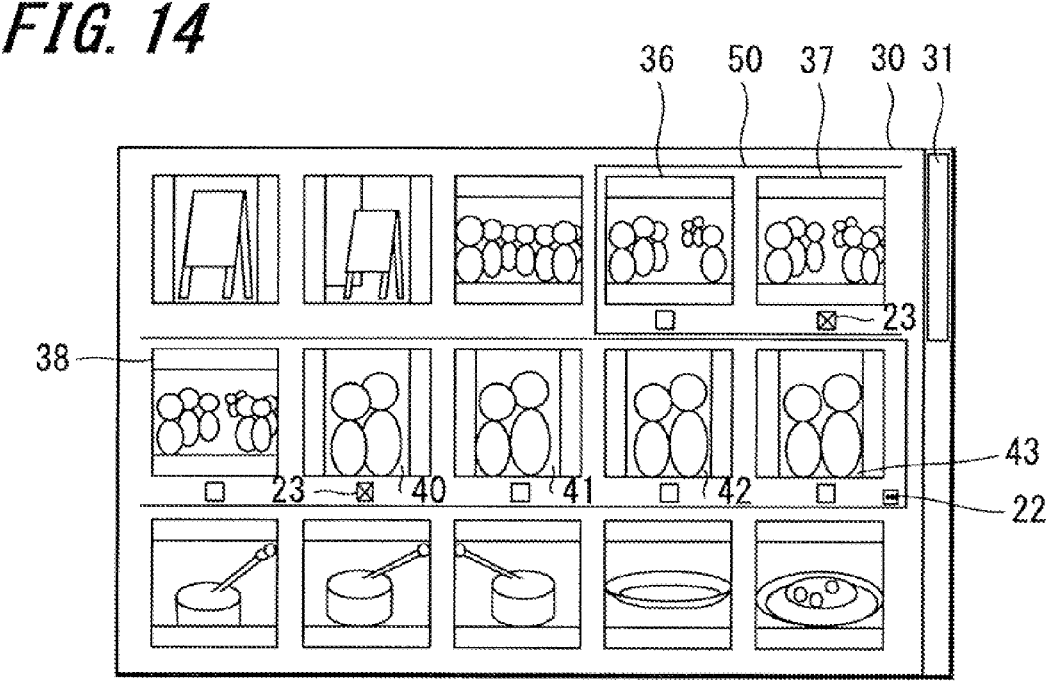
FIG. 14 is a schematic diagram illustrating a display example of the image-listing screen (1) when folding and unfolding groups.
Figure 15:
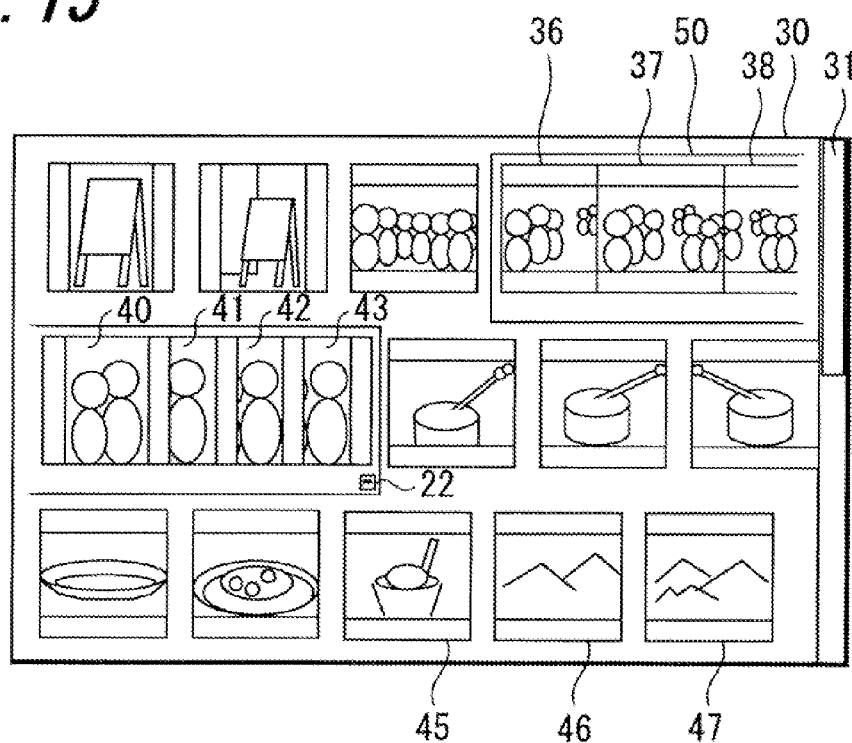
FIG. 15 is a schematic diagram illustrating a display example of the image-listing screen (2) when folding and unfolding groups.
Figure 16:
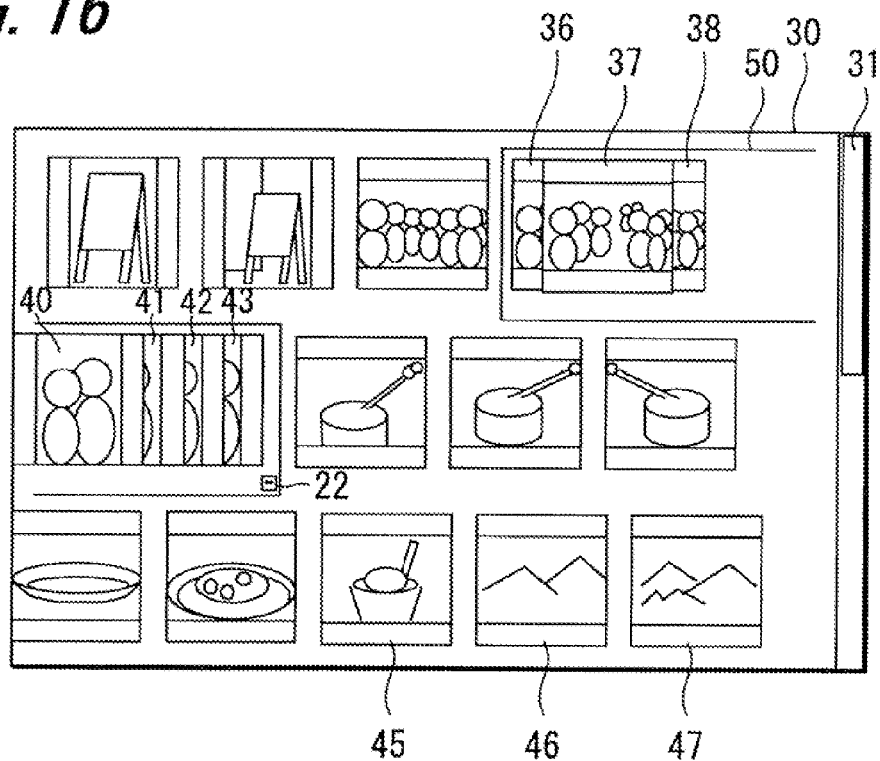
FIG. 16 is a schematic diagram illustrating a display example of the image-listing screen (3) when folding and unfolding groups.
Figure 17:
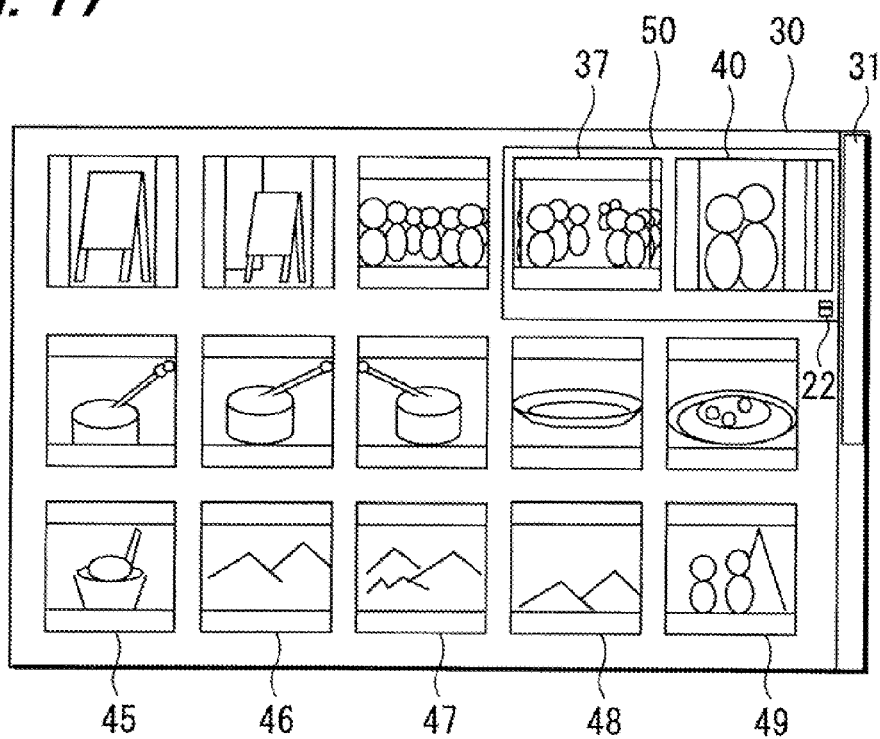
FIG. 17 is a schematic, diagram illustrating a display example of the image-listing screen (4) when folding and unfolding groups.
Figure 18:
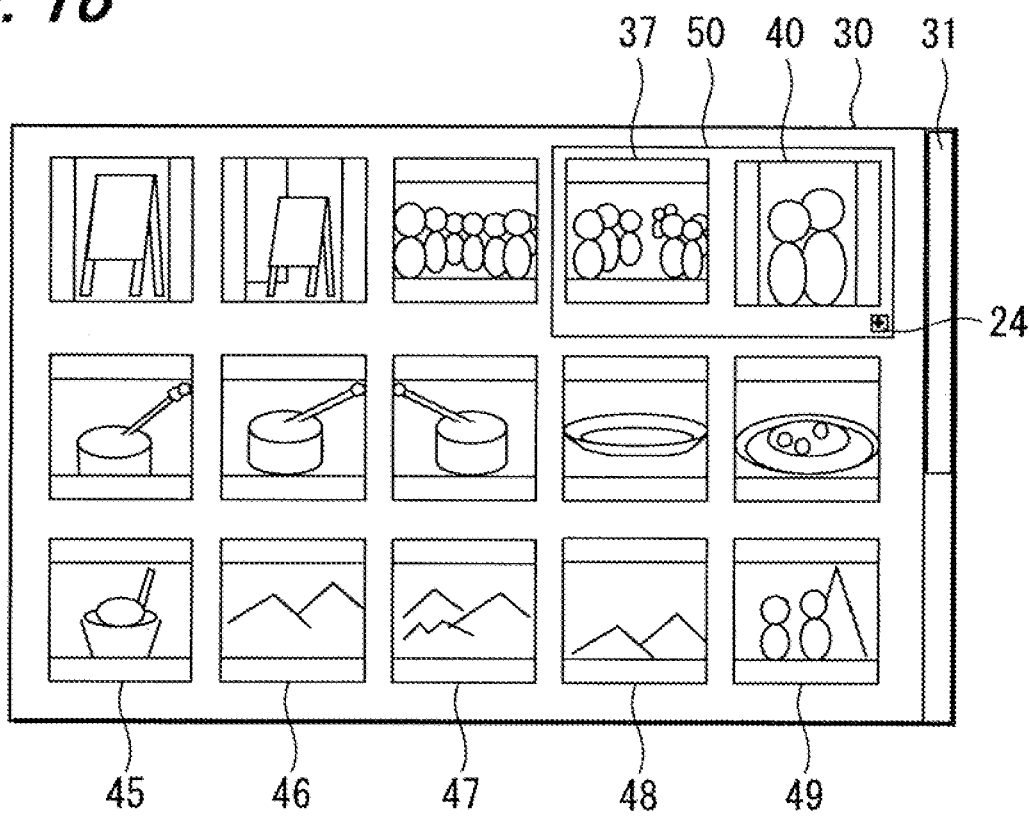
FIG. 18 is a schematic diagram illustrating a display example of the image-listing screen (5) when folding and unfolding groups.

FIG. 14 illustrates the image-listing screen 30 showing a group 50 including images 36 to 43 as members. Image-organizing procedure from this state to the state in which representative images 37 and 40 are displayed after folding the group 50 will be described. First, the user operates the input part 4 to click the folding button 22 at the end of the group 50. Then, as shown in FIG. 15, images 36 to 43 gradually close to each other and then lap over each other. Subsequently, as time advances, the image 36 laps over the back of the image 37 and the images 41 to 43 lap over the back of the image 40 as if being drawn into them as shown in FIG. 16. Furthermore, as time further advances, the images 36 and 38 moved behind the image 37 are almost overlapped and the images 41 to 43 moved behind the image 40 are almost overlapped as shown in FIG. 17. Finally, as shown in FIG. 18, the images 36 and 38 are completely hidden by the image 37 and the images 41 to 43 are completely hidden by the image 40. There, only the images 37 and 40 are displayed as representative images of the group 50. Simultaneously, an unfolding button 24 is displayed at the end of the frame representing the group 50.

During the above process of screen transition as illustrated in FIGS. 14 to 18, the CPU 2 allows the images of the next page to move up as needed and then displays them on a space generated by folding the group 50 on the image-listing screen 30. For example, in FIGS. 15 and 16, images 45 to 47 are moved up from the next page and then displayed. In FIGS. 17 and 18, images 45 to 49 are moved up from the next page and then displayed. In connection with this action, the scroll bar 31 is being extended little by little as shown in FIG. 14 to FIG. 18. In other words, the arrangement of images proceeds smoothly. It can be found that the first half of all images has been organized and the rest may be the second half thereof.

Note that, in the example illustrated in FIGS. 14 to 18, animation is employed to express the screen transition at the time of folding the group. In addition, animation may also be employed at the time of unfolding the group.

<Image Display Processing>

Figure 19:
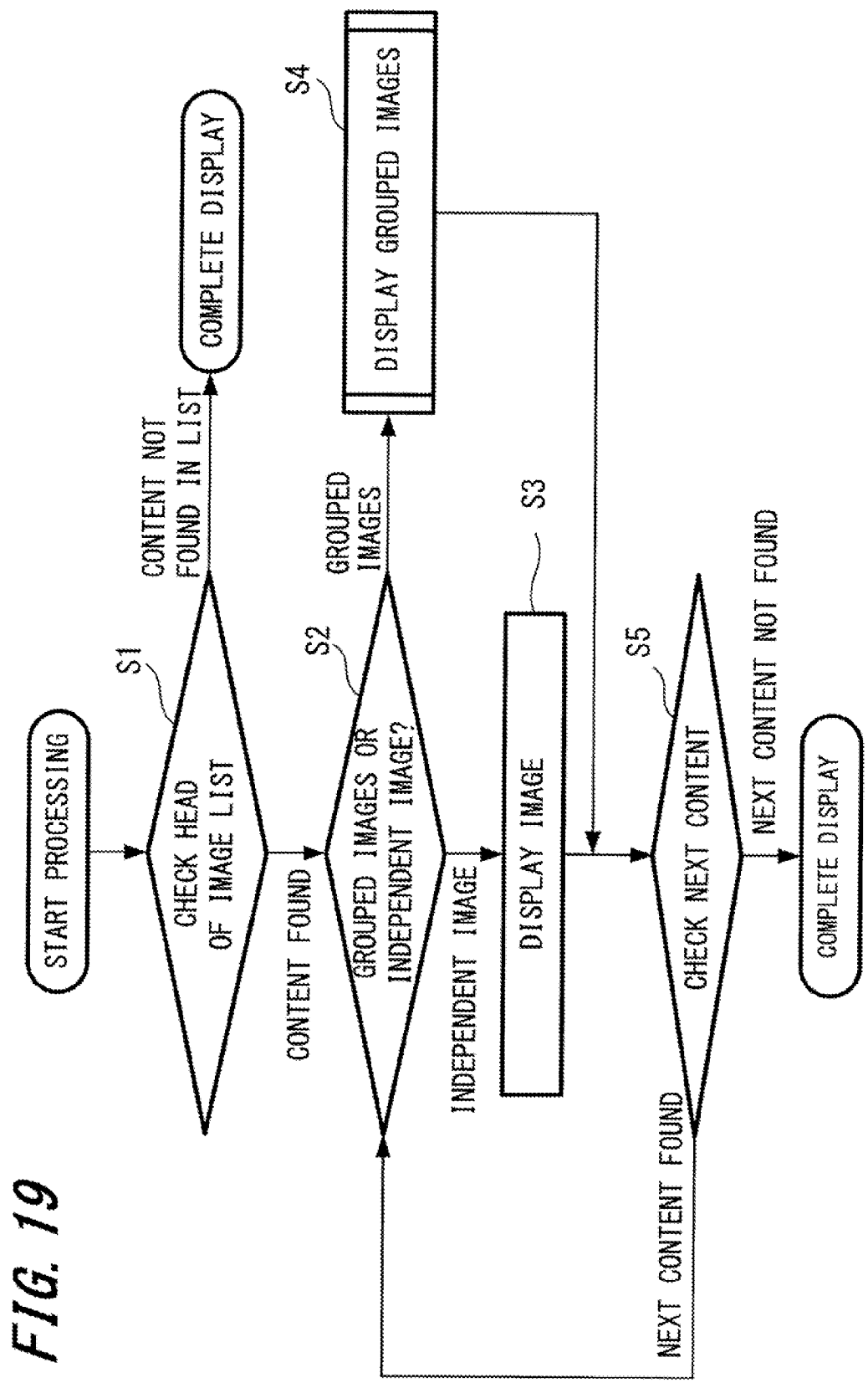
FIG. 19 is a flowchart of the whole image display processing in an image-listing screen.
Figure 20:
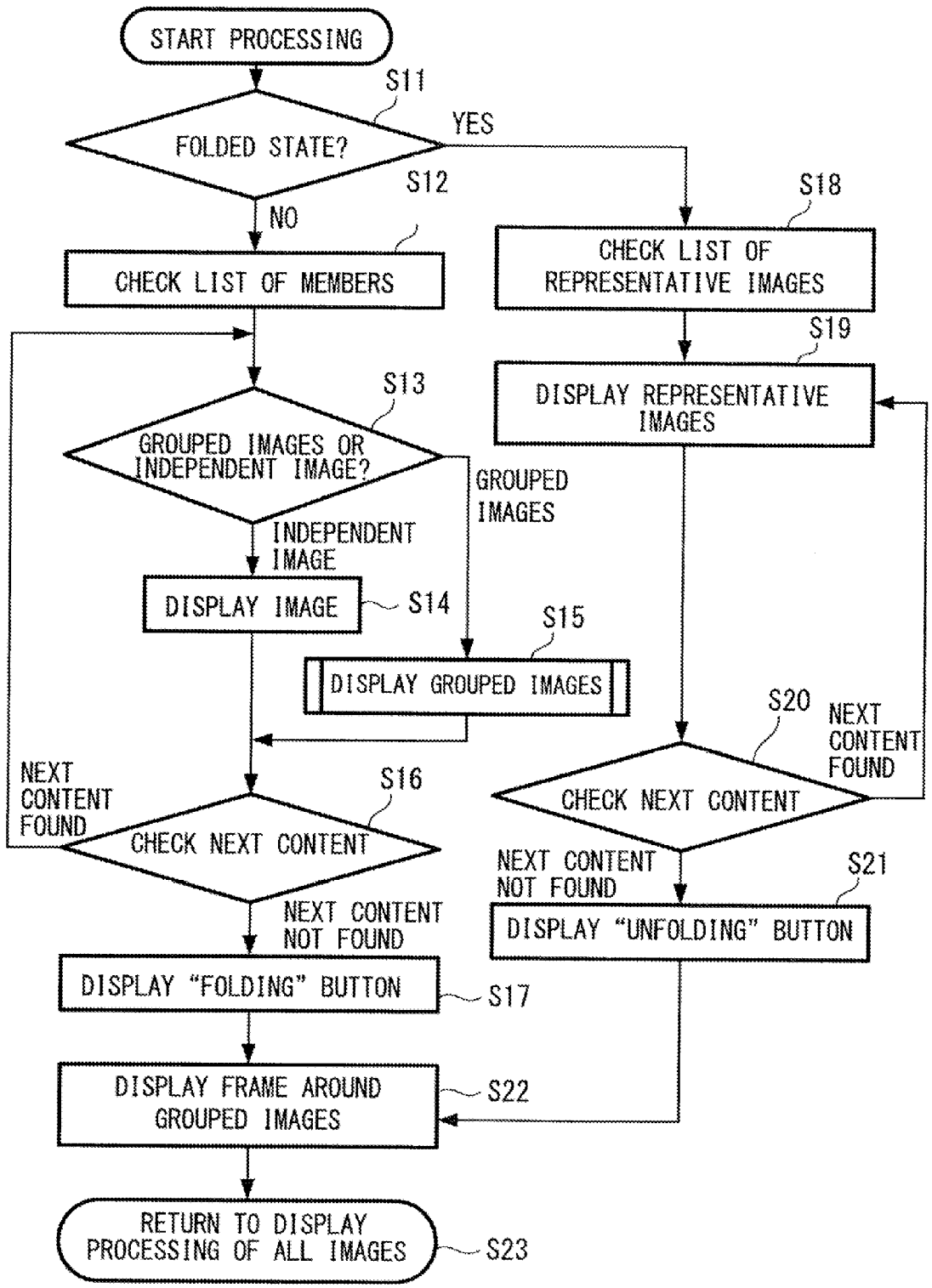
FIG. 20 is a flowchart of the image display processing of a group.

Referring to the flowcharts illustrated in FIGS. 19 and 20, the image display processing on the image-listing screen will be described. As shown in FIG. 19, first, when the image display processing is initiated, for example, the CPU 2 checks the content described at the head of a list of images stored in the hard disk 8 (Step 1). If there is no description in the list, then the display processing is completed. Here, the list of images corresponds to each of the data structures illustrated in FIGS. 6 and 7.

Furthermore, in the determination of Step S1, when the information is already described in the list, the CPU 2 determines whether the described content relates to a group or an independent image (Step S2). If the described content relates to the independent image, then the independent image is displayed on the image-listing screen (Step S3). On the other hand, if the described content relates to the group, then the processing of displaying the images of the group is carried out (step S4).

After displaying the single image or the images of the group, the CPU 2 checks the next content described in the list (Step S5). Subsequently, if the next content is found in the list, then the process returns to the determination processing of Step S2. If the next content is not found, then the sequential display processing is completed.

Here, the processing of displaying the images of the group in Step S4 will be described. FIG. 20 is a flowchart illustrating the processing of displaying the images of the group. In FIG. 20, first, the CPU 2 checks the list (see FIG. 6) and then determines whether the group is in a state of being folded (Step S11). If the group is not folded, then the list of members in the group is checked (Step S12).

Subsequently, the CPU 2 determines whether the content described in the list relates to a group or an independent image (Step S13). If the described content relates to the independent image, then the independent image is displayed on the image-listing screen (Step S14). On the other hand, if the image relates to the group, then the processing of displaying the images of the group is carried out (Step S15).

After displaying the independent image or the images of the group, the CPU 2 checks the next content described in the list (Step S16). Subsequently, if the next content is found in the list, then the process returns to the determination processing of Step S13. If the next content is not found in the list, the folding button of the group is displayed on the image-listing screen (Step S17).

On the other hand, in the determination processing of Step S11, if the list (see FIG. 6) is checked that the group is in a state of being folded, the CPU 2 checks the list of the respective images of the group (Step S18) and then displays the representative images described in the list (Step S19). Furthermore, the content of description of the next representative image of the list is checked (Step S20). If the description about the next representative image is found in the list, then the process returns to the processing in Step S19 and displays the representative images thereof.

Furthermore, in the determination processing in Step S20, if the content of description of the next representative image is not found in the list, then the CPU 2 displays the unfolding button of the group on the image-listing screen (Step S21. Subsequently, after displaying the folding button in the Step S17 or the unfolding button in the Step S21, the frame around the images of the group is displayed (Step S22). After displaying the frame around the images of the group in Step S22, the process returns to the whole image display processing.

Next, the mode switching in the image managing apparatus will be described. The image managing apparatus is able to detect a user's instruction from the input part 4 and switch between an edit mode and a view mode (browsing mode) depending on the detection result.

Figure 21:
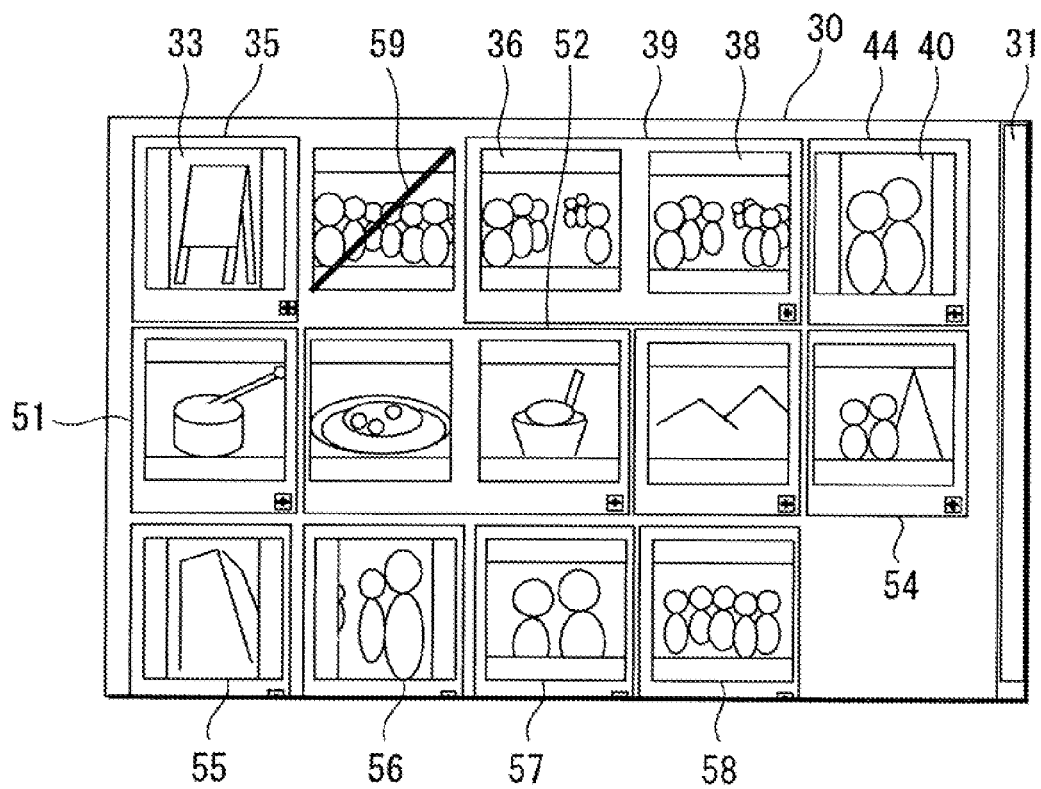
FIG. 21 is a schematic diagram illustrating a display example of an image-listing screen in an edit mode.

FIG. 21 illustrates an example of the edit mode of the image-listing screen.

In the edit mode, the CPU 2 displays the frame around the images of the group and the unfolding button for allowing the user to easily edit (organize) the images. In FIG. 21, a diagonal line 59 displayed on the image indicates that a non-display setting is being selected. In the edit mode, "non-display" can be selected for each image. An image for which non-display is selected is indicated by the diagonal line, thereby showing the image in a non-display mode setting. The image display processing in the edit mode is carried out along the flow shown in FIGS. 19 and 20.

Figure 22:
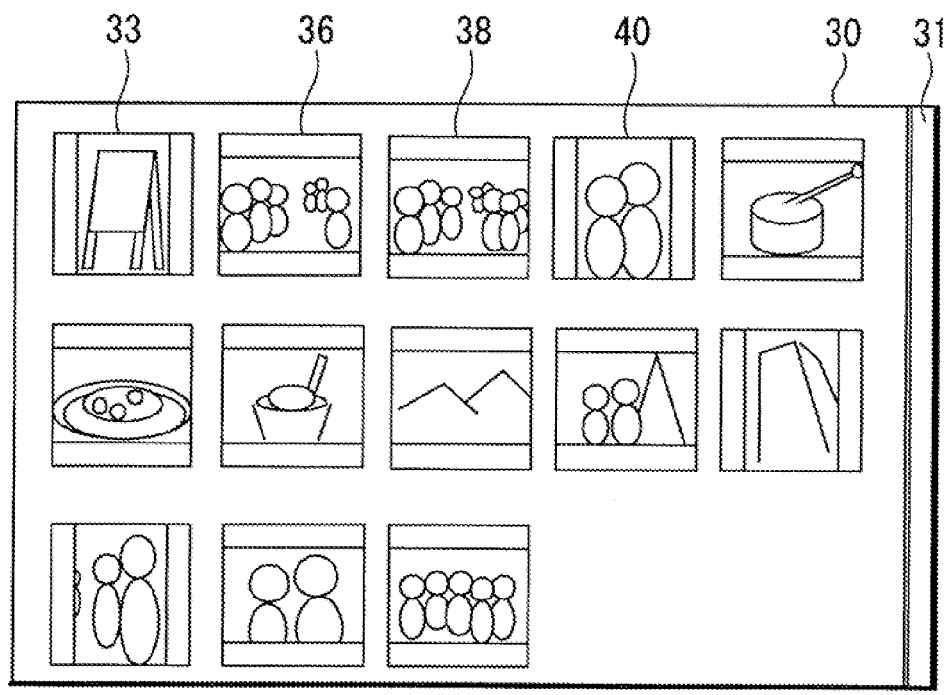
FIG. 22 is a schematic diagram illustrating a display example of an image-listing screen in a view mode.

FIG. 22 illustrates the image-listing screen 30 shown in FIG. 21 in a view mode (browsing mode). In the view mode, the CPU 2 prevents the frames around images of the groups 35, 39, 44, 51, 52, and 54 to 58 from being displayed. Consequently, lines forming the frames are not shown on the image-listing screen, thereby facilitating visualization. In addition, in the view mode, "non-display" can be selected for each image, so that the image on which non-display is selected may be not displayed. For example, in the example shown in FIG. 22, an image between the image 35 and the image 36 is not displayed. Image processing in the view mode is one from which processing in the steps S17, S21, and S22 are omitted from the flowcharts illustrated in FIGS. 19 and 20. In addition, an item about a non-display setting in the list (FIG. 6) is also checked when the processing indicated in the flowcharts of FIGS. 19 and 20 are performed on the images in the non-display setting.

Furthermore, in the view mode, the image on which non-display is selected may not be a subject output through an e-mail, a memory card, or the like. Accordingly, only a desired image can be output, so that an extraction of an image not desired can be avoided.

It should be noted that the representative image of the group is not always located at the head (see FIG. 12). For example, when the group having a plurality of images in a folded state is displayed and the group is then unfolded, the representative image may be located at the front, almost in the middle, or at the rear in the group. As illustrated in the example in FIG. 5, when the image-listing screen is not fit into one page and extends to two pages and the representative image is located on the second page, it may not be convenient for the user. It is because that, the user may need to check the first page and the second page of the image-listing screen. Therefore, if the image-listing screen is set so that the representative image can be located at the head or the front part in the group at any time irrespective of its original position when the group is unfolded, the situation in which the representative image is displayed on the second page can be avoided. Therefore, the user-friendliness can be improved in addition to the visibility being improved. If the position of the representative image in the group after unfolding is determined, the position of the representative image is not always limited to the head or the front part of the group.

<GUI of Application>

Next, an application for carrying out the image managing method in accordance with the embodiment of the present invention will be described.

Figure 23:
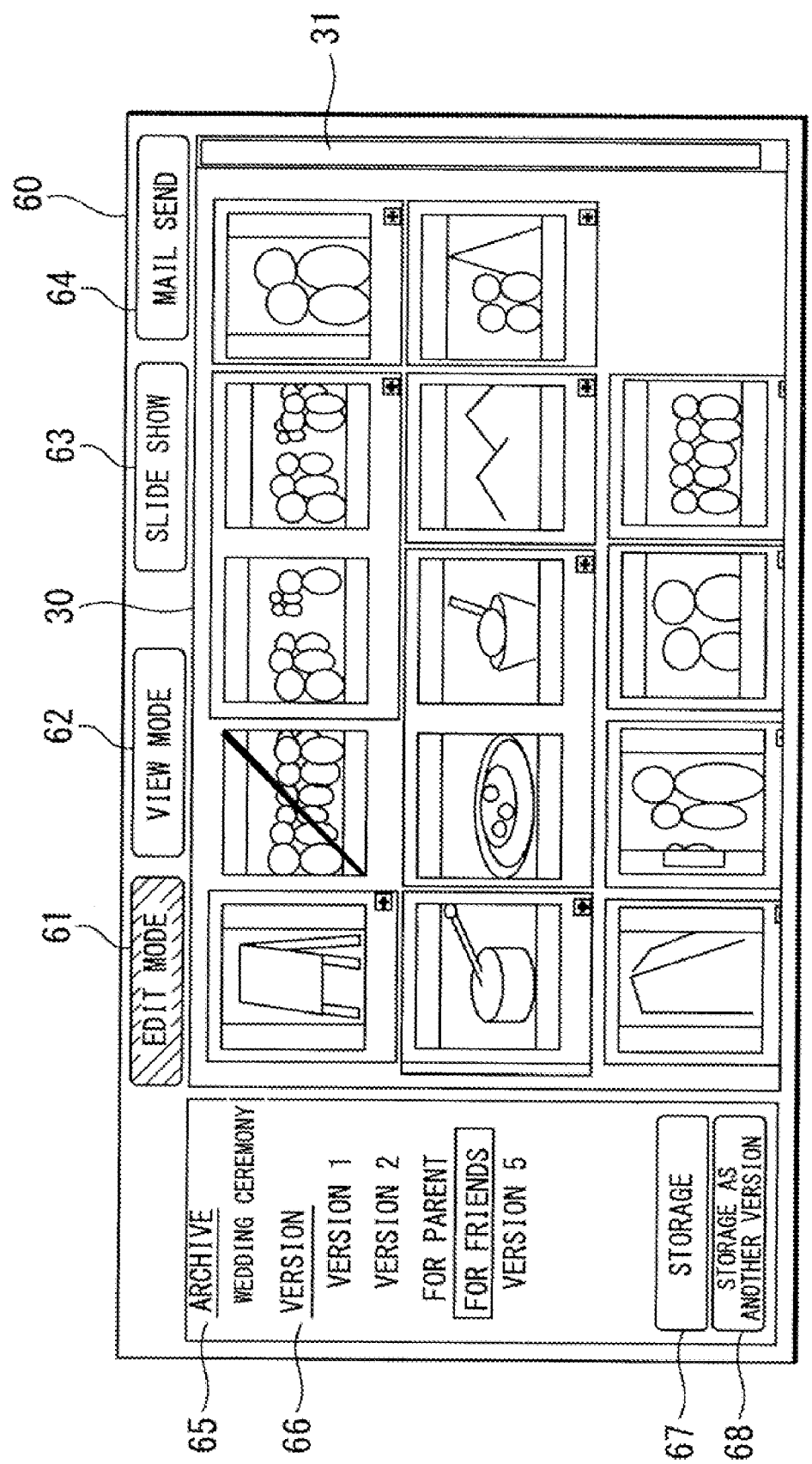
FIG. 23 is a schematic diagram illustrating an example of GUI of image managing application.

FIG. 23 illustrates an example of the user interface (GUI: Graphical User Interface). The GUI illustrated in FIG. 23 includes an area for representing an image-listing screen 60 in the central part thereof. In addition, above the screen 60, an edit mode button 61, a view mode button 62, a slide show button 63, and a mail send button 64 are arranged. Furthermore, on the left of the image-listing screen 60, items of an archive 65 and a version 66 are arranged. In addition, a storage button 67 and storage-as-another-version button 68 are provided.

The edit mode button 61 is a button used when shifting to the edit mode as shown in FIG. 21. The view mode button is a button used when shifting to the view mode as shown in FIG. 22. The slide show button 63 is a button used when carrying out the slide show of images in combination with a movie projector or the like. The mail send button 64 is a button used when sending an image attached to an e-mail message. The archive 65 is an item representing the classification of an Image taken. The version 66 is an item representing the classification of a post-edit image. The storage button 67 is a button used when storing the edit result in the hard disk 8 or the like. The storage-as-another-version button 68 is a button used when storing with an item not displayed in the version 66.

According to the embodiment of the present invention, each of the images and the groups is provided with the data structure as shown in FIGS. 6 and 7. Thus, information about the group to which the image belongs, information about whether the image is selected as a representative image, information about whether the image is viewed in a folded state, and other kinds of information are recorded as tags on the respective images in the hard disk 8 or the like. Therefore, the state in which the images are grouped and folded can be stored in the hard disk 8. In addition, according to the embodiment, when the user attaches a tag on a group, the tag may be applied to all of the images in the group or applied only to a representative image.

In addition, when the user selects the slide show or sending an e-mail with a group in a folded state, the representative image alone is displayed in the group and only the representative image can be sent by an e-mail.

In addition, a plurality of the folding states can be stored for the same archive in the hard disk 8. Therefore, a plurality of albums in different versions (for example, for friends, for relatives, and for the user) or the like can be made easily for one event.

Furthermore, if it is desired to prepare an album in new version based on the fact that a plurality of versions can be prepared for one event, an album in existing version may be copied and used. Therefore, it is user-friendliness and convenient.

Further, at the initial stage, or by allowing the user to select from the menu (not shown), the image classification part 12 may automatically carry out the grouping of images on the basis of the time of photo-shooting and the location information recorded using GPS (Global Positioning System) or the like. Images may be classified using an image recognition technology or the like and groups may be automatically formed based on the classification. In addition, when a typical folder is specified to read an image as an archive, the original folder structure may be reflected as a group on managing the image.

However, the technique of image managing in accordance with the embodiment of the present invention, it is important that the user manually arranges images at the end. In other words, the embodiment of the present invention intends to provide a tool which makes works of carefully examining, selecting, and organizing by a human comfortable and the characteristic feature thereof can be found in its operation sequence. It is preferable that the processing of such automatic classification and extraction may be incorporated as an assistance of work to attain an improvement in convenience. However, it is a user interface for carrying out a part, which (the user considers) may be insufficient with the automatic organization, by the user.

The difference between the embodiment of the present invention and one such as the Explorer of Windows® is that, according to the embodiment, the contents (images) are shown as being flat while retaining a hierarchical structure; and a state of showing all with respect to the contents (images) and a state of showing only some selected representatives can be easily switched. While seeing upper hierarchy, all or part (representative) of images in the lower hierarchy may be handled in a manner similar to the images in the upper hierarchy.

<Others>

It should be appreciated that an embodiment of the present invention can also be attained by supplying a recording medium, such as a memory card 7, on which a program code of a software for realizing the functions of the above embodiment, to a system or an apparatus, and reading and executing the program code stored in the recording medium by a computer (or an arithmetic processing unit, such as CPU 2) in the system or the apparatus.

Furthermore, the above embodiment Is a preferable specific example of the embodiment of the present invention, so that it is provided with various technically-preferable limitations. However, the scope of the invention is not limited to any of these embodiments as long as any particular limitation of the present invention is not described in the above description.

It should be understood by those skilled in the art that various modifications, combinations, sub-combinations and alterations may occur depending on design requirements and other factors insofar as they are within the scope of the appended claims or the equivalents thereof.

What is claimed is:

1. An image managing apparatus, comprising:
a storage part for storing an image;
an input part for inputting a user's instruction; and
a central processing unit that operates as:
  a grouping-processing part for classifying images displayed on an image-listing screen in an edit mode into a plurality of groups for display on the basis of the instruction from the input part;
  a representative image extraction part for extracting at least two images among images in each of the plurality of groups in accordance with the instruction from the input part to be at least two representative images of each group;
  a folding-button preparing part for preparing a folding button for displaying the at least two representative images of each group on the image-listing screen;
  a folding-screen preparing part for preparing the image-listing screen to be a folding screen on which the at least two representative images of each group and at least one ungrouped image are displayed when the folding button displayed on the image-listing screen is operated;

an output part for outputting the image-listing screen to the outside;

an unfolding button preparing part for preparing an unfolding button for displaying on the folding screen another image of each group represented by the at least two representative images displayed on the folding screen; and an unfolding-image preparing part for preparing the image-listing screen to be an unfolding screen including said another image of each group and the at least one ungrouped image, when the unfolding button displayed on the folding screen is operated wherein the input part is configured to allow a user to select more than the at least two representative images of each group, and wherein the total number of images in each group is greater than the number of images corresponding to the selected representative images of each group, wherein the plurality of groups are hierarchically organized by one of date, place, or occasion into a parent group, and wherein an image of one of the plurality of groups is selected to be displayed as a representative image of the parent group, and wherein a screen transition between the folding screen and the unfolding screen is represented using animation, wherein during a transition from the unfolding screen to the folding screen, the images not selected as representative images appear to move behind the representative images so that only the representative images and the at least one ungrouped image are visible on the folding screen.

2. The image managing apparatus according to claim 1, wherein when the user selects at least two images from the images included in each group, the representative image extraction part provides the at least two selected images as the at least two representative images of each group.

3. The image managing apparatus according to claim 2, wherein the control part outputs the at least two representative images in each group and the at least one ungrouped image, which form the folding screen, to the outside when images forming the folding screen are outputted on the basis of an instruction from the input part.

4. The image managing apparatus according to claim 3, wherein when the control part receives an instruction of not displaying the specified image of the folding screen from the input part, the control part does not output the specified image in the folding screen to the outside.

5. The image managing apparatus according to claim 1, wherein when the user does not select at least one representative image from the images included in each group, the representative image extraction part selects a leading image in each group as a representative image of that group.

6. The image managing apparatus according to claim 1, wherein the storage part stores contents of a plurality of different folding screens prepared on the basis of the user's instruction for the images stored in the storage part.

7. The image managing apparatus according to claim 1, wherein the screen is changed to a browsing mode on the basis of an instruction from the input part; and at least one group for display on the folding screen is changed to be non-displayed.

8. The image managing apparatus according to claim 7, wherein a specified image in the folding screen is not displayed when a control part receives an instruction of not displaying the specified image in the folding screen from the input part.

9. The image managing apparatus according to claim 1, wherein the input part is configured to allow a user to select at least two images as the at least two representative images of each group, and to display each representative image when the folding button is operated.

10. The image managing apparatus according to claim 1, wherein the image-listing screen is configured to display the at least two representative images at a front part of each group on the image-listing screen regardless of where the at least two representative images are originally selected from within the group.

11. The image managing apparatus according to claim 1, wherein the image selected to be displayed as the representative image of the parent group is one of the at least two representative images of the plurality of groups.

12. An image managing method, comprising the steps of:

classifying images displayed on an image-listing screen in an edit mode into a plurality of groups for display on the basis of an instruction from an input part;

extracting at least two images among images in each of the plurality of groups in accordance with the instruction from the input part to be at least two representative images of each group, wherein the input part allows a user to select more than two images as the at least two representative images of each group, and wherein the total number of images in each group is greater than the number of images corresponding to the selected representative images of each group;

preparing a folding button for displaying the at least two representative images of each group on the image-listing screen;

preparing the image-listing screen to be a folding screen on which the at least two representative images of each group and at least one ungrouped image are displayed when the folding button displayed on the screen is operated;

preparing an unfolding button for displaying on the folding screen another image of each group represented by the at least two representative images displayed on the folding screen;

preparing the image-listing screen to be an unfolding screen including said another image of each group and the at least one ungrouped image, when the unfolding button displayed on the folding screen is operated; and outputting the image-listing screen to the outside, wherein the plurality of groups are hierarchically organized by one of date, place, or occasion into a parent group, wherein a representative image of one of the plurality of groups is selected to be displayed as a representative image of the parent group; and wherein a screen transition between the folding screen and the unfolding screen is represented using animation, wherein during a transition from the unfolding screen to the folding screen, the images not selected as representative images appear to move behind the representative images so that only the representative images and the at least one ungrouped image are visible on the folding screen.

13. The image managing method according to claim 12, wherein the image selected to be displayed as the representative image of the parent group is one of the at least two representative images of the plurality of groups.

14. An image managing program stored on a non-transitory computer readable medium for allowing a computer to execute procedures of:

classifying images displayed on an image-listing screen in an edit mode into a plurality of groups for display on the basis of an instruction from an input part;

extracting at least two images among images in each of the plurality of groups in accordance with the instruction from the input part to be at least two representative images of each group, wherein the input part allows a user to select more than two images as the at least two representative images of each group, and wherein the number of images in each group is greater than the total number of images corresponding to the selected representative images of each group;

preparing a folding button for displaying the at least two representative images of each group on the image-listing screen;

preparing the image-listing screen to be a folding screen on which the at least two representative images of each group and at least one ungrouped image are displayed when the folding button displayed on the screen is operated;

preparing an unfolding button for displaying on the folding screen another image of each group represented by the at least two representative images displayed on the folding screen;

preparing the image-listing screen to be an unfolding screen including said another image of each group and the at least one ungrouped image, when the unfolding button displayed on the folding screen is operated; and outputting the image-listing screen to the outside, wherein the program allows the computer to hierarchically organize the plurality of groups by one of date, place, or occasion into a parent group, wherein a representative image of one of the plurality of groups is selected to be displayed as a representative image of the parent group; and wherein the program allows a screen transition between the folding screen and the unfolding screen to be represented using animation, wherein during a transition from the unfolding screen to the folding screen, the images not selected as representative images appear to move behind the representative images so that only the representative images and the at least one ungrouped image are visible on the folding screen.

15. The image managing program according to claim 14, wherein the image selected to be displayed as the representative image of the parent group is one of the at least two representative images of the plurality of groups.

* * * * *